(12) United States Patent
Hong et al.

(10) Patent No.: US 9,829,752 B2
(45) Date of Patent: Nov. 28, 2017

(54) LIQUID CRYSTAL DISPLAY DEVICE

(71) Applicant: SAMSUNG DISPLAY CO., LTD., Yongin-si (KR)

(72) Inventors: Kipyo Hong, Hwaseong-si (KR); Wan Namgung, Asan-si (KR); Ikhan Oh, Cheonan-si (KR); Hojun Lee, Asan-si (KR); Younhak Jeong, Cheonan-si (KR)

(73) Assignee: SAMSUNG DISPLAY CO., LTD., Gyeonggi-D (KR)

( * ) Notice: Subject to any disclaimer, the term of this patent is extended or adjusted under 35 U.S.C. 154(b) by 0 days.

(21) Appl. No.: 14/940,125

(22) Filed: Nov. 12, 2015

(65) Prior Publication Data
US 2016/0320672 A1 Nov. 3, 2016

(30) Foreign Application Priority Data

Apr. 28, 2015 (KR) .................. 10-2015-0059714

(51) Int. Cl.
*G02F 1/1339* (2006.01)
*G02F 1/1362* (2006.01)
G02F 1/1335 (2006.01)
G02F 1/1343 (2006.01)

(52) U.S. Cl.
CPC .... *G02F 1/13394* (2013.01); *G02F 1/136209* (2013.01); *G02F 1/133512* (2013.01); *G02F 2001/13396* (2013.01); *G02F 2001/134318* (2013.01); *G02F 2001/134345* (2013.01)

(58) Field of Classification Search
CPC ......... G02F 1/133707; G02F 1/133512; G02F 1/13394; G02F 1/134309
See application file for complete search history.

(56) References Cited

U.S. PATENT DOCUMENTS

| 2001/0040656 | A1* | 11/2001 | Na | G02F 1/133512 349/110 |
| 2001/0043301 | A1* | 11/2001 | Liu | G02F 1/133707 349/129 |
| 2004/0075798 | A1* | 4/2004 | Inoue | G02F 1/133707 349/129 |
| 2005/0264722 | A1* | 12/2005 | Choi | G02F 1/1393 349/110 |

(Continued)

FOREIGN PATENT DOCUMENTS

| KR | 1020120014749 | 2/2012 |
| KR | 1020130137457 | 12/2013 |

(Continued)

*Primary Examiner* — James Dudek
(74) *Attorney, Agent, or Firm* — Cantor Colburn LLP

(57) ABSTRACT

A liquid crystal display device includes a first substrate including a pixel area and a light shielding area, a second substrate opposing the first substrate, a liquid crystal layer between the first and second substrates, the liquid crystal layer including a liquid crystal molecule, a pixel electrode disposed on the first substrate corresponding to the pixel area, the pixel electrode including at least one unit pixel electrode, a light shielding member disposed on the first substrate corresponding to the light shielding area, and a projection on the first substrate, the projection overlapping a portion of the unit pixel electrode, wherein the projection is spaced apart from the light shielding member.

19 Claims, 18 Drawing Sheets

(56) References Cited

U.S. PATENT DOCUMENTS

| | | | | |
|---|---|---|---|---|
| 2007/0247574 | A1* | 10/2007 | Kudo | G02F 1/133555 349/114 |
| 2011/0043438 | A1* | 2/2011 | Hongo | G02F 1/133707 345/87 |
| 2011/0261277 | A1* | 10/2011 | Chung | G02F 1/133707 349/43 |
| 2012/0038867 | A1* | 2/2012 | Kwon | G02F 1/133512 349/110 |
| 2013/0329155 | A1 | 12/2013 | Kwak et al. | |
| 2014/0049717 | A1 | 2/2014 | Kwak et al. | |
| 2014/0232970 | A1 | 8/2014 | Huh et al. | |
| 2015/0153618 | A1* | 6/2015 | Hao | G02F 1/133514 349/106 |
| 2015/0219968 | A1* | 8/2015 | Zhao | G02F 1/1337 349/43 |
| 2016/0306241 | A1* | 10/2016 | Choi | G02F 1/1335 |

FOREIGN PATENT DOCUMENTS

| | | |
|---|---|---|
| KR | 1020140023710 | 2/2014 |
| KR | 1020140102797 | 8/2014 |

* cited by examiner

LIQUID CRYSTAL DISPLAY DEVICE

This application claims priority to Korean Patent Application No. 10-2015-0059714, filed on Apr. 28, 2015, and all the benefits accruing therefrom under 35 U.S.C. §119, the content of which in its entirety is incorporated herein by reference.

BACKGROUND

1. Field

Exemplary embodiments of the invention relate to a liquid crystal display ("LCD") device, and more particularly, to an LCD device capable of patterning a light shielding member, a projection, and a column spacer in the same process using the same material.

2. Description of the Related Art

A liquid crystal display ("LCD") device is a type of flat panel display ("FPD") device which has been widely used recently. An LCD device generally includes two substrates having electrodes formed thereon and a liquid crystal layer interposed therebetween. In such an LCD device, liquid crystal molecules of the liquid crystal layer are rearranged upon voltages being applied to the two electrodes, and thereby the amount of transmitted light is adjusted in the LCD device.

Such LCD devices include a projection formed thereon to allow a liquid crystal to have a pretilt so as to increase a response speed and a restoring speed after external impacts are applied thereto. Conventionally, a projection may be formed through an additional process of etching an insulating layer or may be formed simultaneously with a column spacer in the same process.

SUMMARY

As a liquid crystal is pretilted along an inclined surface of a projection, light leakage may occur on a periphery of a projection.

Exemplary embodiments of the invention are directed to a liquid crystal display ("LCD") device simplified in regard to a manufacturing process thereof and capable of preventing light leakage occurring on the periphery of the projection.

According to an exemplary embodiment of the invention, a liquid crystal display device includes a first substrate including a pixel area and a light shielding area, a second substrate opposing the first substrate, a liquid crystal layer between the first and second substrates, the liquid crystal layer including a liquid crystal molecule, a pixel electrode disposed on the first substrate corresponding to the pixel area, the pixel electrode including at least one unit pixel electrode, a light shielding member disposed on the first substrate corresponding to the light shielding area, and a projection on the first substrate, the projection overlapping a portion of the unit pixel electrode, wherein the projection is spaced apart from the light shielding member.

In an exemplary embodiment, the light shielding member and the projection may include a same material.

In an exemplary embodiment, the light shielding member and the projection may be patterned in a same process.

In an exemplary embodiment, a portion of the projection may contact an edge of the unit pixel electrode.

In an exemplary embodiment, the projection may be disposed between the unit pixel electrodes.

In an exemplary embodiment, the unit pixel electrode may include a cross-shaped stem portion defining a boundary of a plurality of sub-regions of the unit pixel electrode and a minute branch portion extending from the cross-shaped stem portion in upper-right, lower-right, upper-left, and lower-left directions.

In an exemplary embodiment, the liquid crystal display device may further include a common electrode including at least one unit common electrode opposing the unit pixel electrode, wherein the unit common electrode has an aperture opposing the cross-shaped stem portion and extending in parallel thereto.

In an exemplary embodiment, the projection may include an edge portion overlapping the edge of the pixel electrode.

In an exemplary embodiment, the projection may include a lattice portion overlapping the aperture of the common electrode.

In an exemplary embodiment, the pixel electrode may include a plurality of unit pixel electrodes and the common electrode may include a plurality of unit common electrodes, the plurality of unit pixel electrodes may be connected to one another through a first connector on an extension of the cross-shaped stem portion, and the plurality of unit common electrodes may be connected to one another through a second connector on an extension of the aperture.

In an exemplary embodiment, a portion of the projection may overlap the first connector.

In an exemplary embodiment, the light shielding member may include a first column spacer protruding toward the second substrate, the first column spacer maintaining a gap between the first substrate and the second substrate.

In an exemplary embodiment, the light shielding member may include a second column spacer protruding toward the second substrate, the second column spacer having a height lower than a height of the first column spacer.

In an exemplary embodiment, the light shielding member, the first column spacer, the second column spacer, and the projection may be patterned in a same process.

In an exemplary embodiment, the projection may have a height lower than that of the first column spacer and that of the second column spacer.

In an exemplary embodiment, the pixel electrode may include a first sub-pixel electrode including at least one unit pixel electrode and a second sub-pixel electrode including at least one unit pixel electrode.

In an exemplary embodiment, the number of the unit pixel electrodes included in the second sub-pixel electrode may be greater than the number of the unit pixel electrodes included in the first sub-pixel electrode.

In an exemplary embodiment, the projection may be disposed between the unit pixel electrodes.

In an exemplary embodiment, the projection may include an edge portion overlapping the edge of the pixel electrode.

In an exemplary embodiment, the projection may include a lattice portion overlapping the aperture of the common electrode.

In an exemplary embodiment, the foregoing is illustrative only and is not intended to be in any way limiting. In addition to the illustrative exemplary embodiments, embodiments, and features described above, further exemplary embodiments, embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
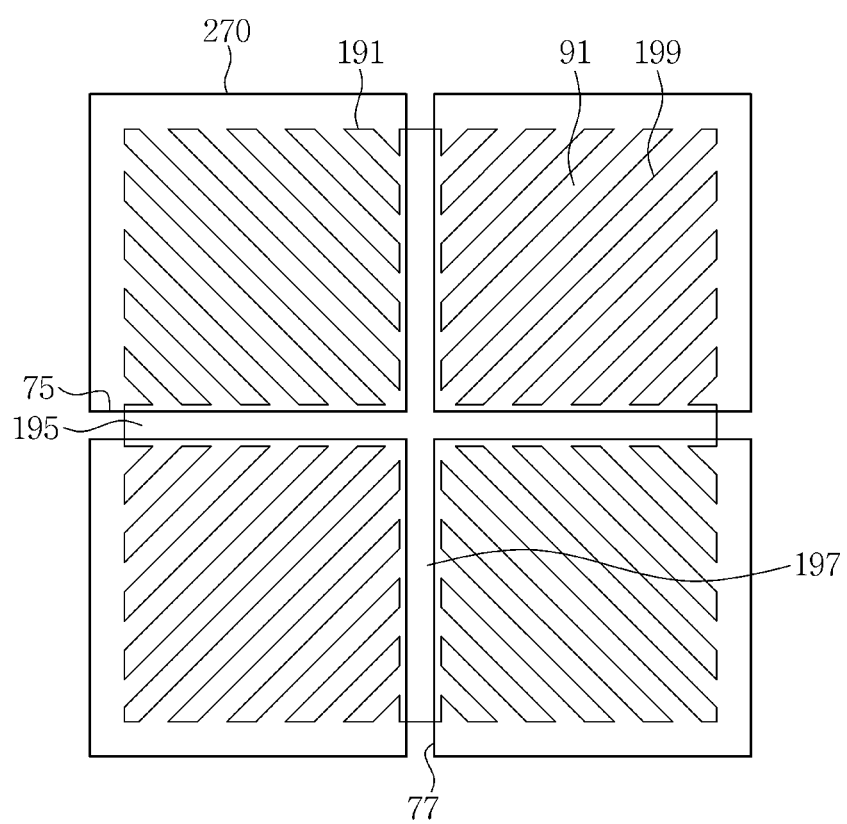
FIG. 1 is a schematic plan view illustrating an exemplary embodiment of a pixel electrode and a common electrode according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments and may be modified according to the relevant art and the intention of an applicant. Therefore, the terms used herein should be interpreted as having a meaning that is consistent with their meanings in the context of the disclosure, and is not intended to limit. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, an exemplary embodiment with respect to a liquid crystal display ("LCD") device will be described with reference to FIGS. 1 through 4.

Figure 2:
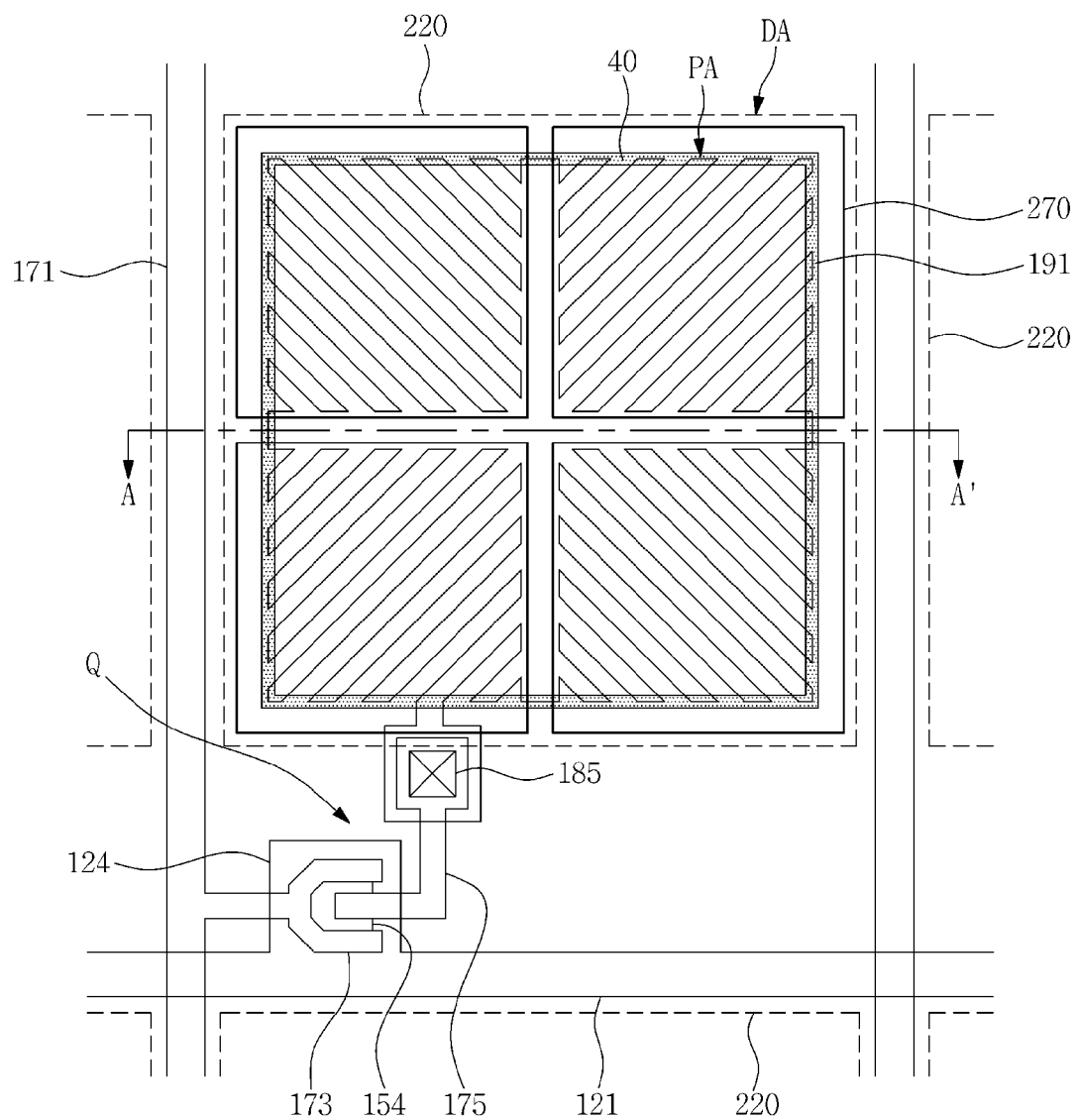
FIG. 2 is a schematic plan view illustrating the exemplary embodiment of a pixel of a liquid crystal display ("LCD") device shown in FIG. 1 according to the invention.
Figure 3:
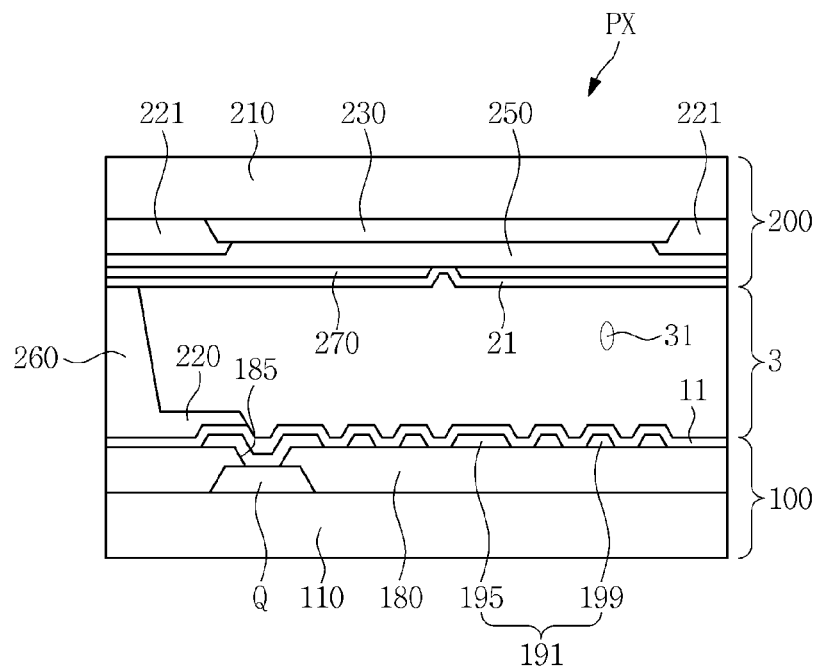
FIG. 3 is a cross-sectional view illustrating the LCD device of FIG. 2.
Figure 4:
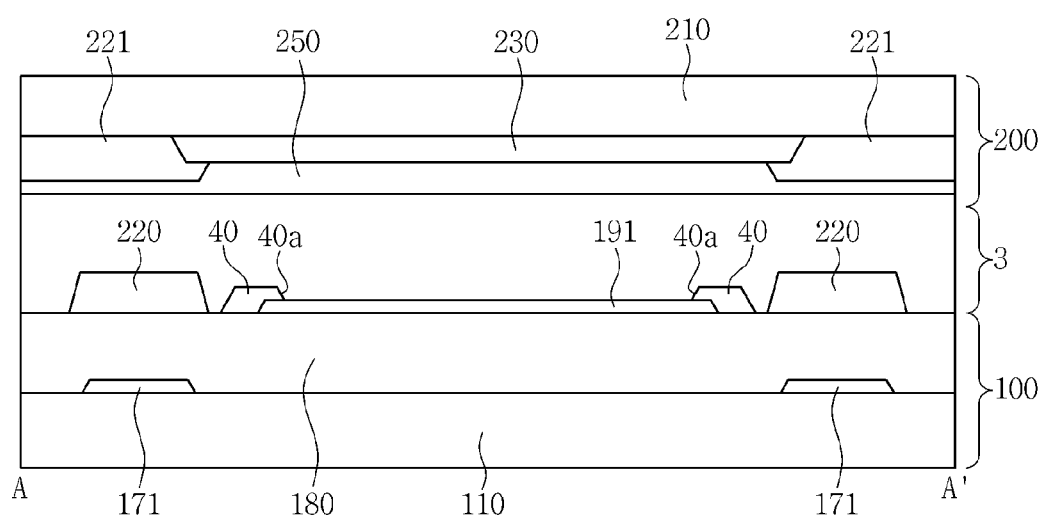
FIG. 4 is a cross-sectional view taken along line A-A' of FIG. 2.

FIG. 1 is a schematic plan view illustrating a pixel electrode 191 and a common electrode 270 according to an exemplary embodiment. FIG. 2 is a schematic plan view illustrating a pixel of the LCD device according to the exemplary embodiment shown in FIG. 1. FIG. 3 is a cross-sectional view illustrating the LCD device of FIG. 2. FIG. 4 is a cross-sectional view taken along line A-A' of FIG. 2.

Referring to FIGS. 1 through 4, an overall shape of the pixel electrode 191 disposed in a pixel may have a quadrangular shape, and the pixel electrode 191 may include a cross-shaped stem portion including a transverse stem portion 195 and a longitudinal stem portion 197 that intersects the transverse stem portion 195. The pixel electrode 191 of the pixel may be divided into four sub-regions by the transverse stem portion 195 and the longitudinal stem portion 197, and may include a plurality of minute branch portions 199 disposed in each of the sub-regions. A minute slit 91 in which the pixel electrode 191 is removed may be positioned between adjacent minute branch portions 199.

The transverse stem portion 195 of the pixel electrode 191 may extend to be substantially parallel to a gate line 121, and the longitudinal stem portion 197 of the pixel electrode 191 may extend to be substantially parallel to a data line 171.

From among the four sub-regions, a minute branch portion 199 of a sub-region in an upper-left direction may extend obliquely from the transverse stem portion 195 or the longitudinal stem portion 197 in the upper-left direction, a minute branch portion 199 of a sub-region in an upper-right direction may extend obliquely from the transverse stem portion 195 or the longitudinal stem portion 197 in the upper-right direction, a minute branch portion 199 of a sub-region in a lower-left direction may extend obliquely from the transverse stem portion 195 or the longitudinal stem portion 197 in the lower-left direction, and a minute branch portion 199 of a sub-region in a lower-right direction may extend obliquely from the transverse stem portion 195 or the longitudinal stem portion 197 in the lower-right direction.

In an exemplary embodiment, a pitch of the minute branch portion 199 and the minute slit 91 may be in a range of about 5 micrometers ($\mu$m) to about 8 $\mu$m, but the pitch thereof is not limited thereto. In an exemplary embodiment, a width ratio between the minute branch portion 199 and the minute slit 91 may be in a range of about 1.5:1 to about 1:1.5, for example. However, the width ratio therebetween is not limited thereto and may be adjusted as necessary based on display characteristics of the LCD device.

In an exemplary embodiment, a width of the transverse stem portion 195 or the longitudinal stem portion 197 of the pixel electrode 191 may be in a range of about 4 $\mu$m to about 6 $\mu$m for example, but the width thereof is not limited thereto.

An acute angle defined between the minute branch portion 199 and the transverse stem portion 195 may be in a range of about 40 degrees to about 45 degrees, for example. However, the acute angle therebetween is not limited thereto and may be adjusted as necessary based on display characteristics of the LCD device such as visibility, and the like.

Respective end portions of the plurality of minute branches 199 in at least one of upper, lower, left, and right portions of the pixel electrode 191 may be connected to one another by a connector (not illustrated) having a linear shape. In an exemplary embodiment, at least one of respective end portions of the minute branch portions 199 in the upper portion of the pixel electrode 191, respective end portions of the minute branch portions 199 in the lower portion of the pixel electrode 191, respective end portions of the minute branch portions 199 in the left portion of the pixel electrode 191, and respective end portions of the minute branch portions 199 in the right portion of the pixel electrode 191, may be connected to one another so as to define an outer edge of the pixel electrode 191.

The pixel electrode 191 illustrated in FIG. 1 may provide a unit pixel electrode, which is a unit of pixel electrodes according to various exemplary embodiments which are to be described below.

In an exemplary embodiment, a common electrode 270 on a pixel may substantially have a quadrangular shape, and may include a cross-shaped aperture including a transverse aperture 75 and a longitudinal aperture 77 that intersects the transverse aperture 75, for example. In an exemplary embodiment, the common electrode 270 on the pixel may be divided into four sub-regions by the cross-shaped aperture, for example.

In an exemplary embodiment, a width of the cross-shaped aperture, for example, the transverse aperture 75 and the longitudinal aperture 77, may be in a range of about 3 $\mu$m to about 5 $\mu$m for example, but the width thereof is not limited thereto. In the common electrode 270, the width of the transverse aperture 75 and the width of the longitudinal aperture 77 may be the same as or may differ from one another based on display characteristics of the LCD device.

The common electrode 270 illustrated in FIG. 1 may provide a unit common electrode, which is a unit of common electrodes according to various exemplary embodiments which are to be described below.

The cross-shaped stem portion of the pixel electrode 191, for example, the transverse stem portion 195 and the longitudinal stem portion 197, and the cross-shaped aperture of the common electrode 270, for example, the transverse aperture 75 and the longitudinal aperture 77, may be aligned to oppose one another, and the four sub-regions of the pixel electrode 191 may oppose the four sub-regions of the common electrode 270, respectively. The cross-shaped aperture of the common electrode 270, for example, the transverse aperture 75 and the longitudinal aperture 77, may extend in parallel to the cross-shaped stem portion, for example, the transverse stem portion 195 and the longitudinal stem portion 197, of the pixel electrode 191, respectively.

Referring to FIGS. 2, 3, and 4, the LCD device according to the exemplary embodiment may include a lower display panel 100 and an upper display panel 200 opposing one another, and a liquid crystal layer 3 interposed between the lower display panel 100 and the upper display panel 200.

A description pertaining to the lower display panel 100 will be provided hereinbelow. In the lower display panel 100, a first substrate 110 may include a pixel area PA and a light shielding area DA. The pixel area PA may have a portion in which the pixel electrode 191 is disposed, and the light shielding area DA may have a portion in which the gate line 121, the data line 171, a thin film transistor ("TFT") Q, and the like, are disposed.

The gate line 121 including a gate electrode 124 may be disposed on the first substrate 110. The gate line 121 may transmit a gate signal and may substantially extend in a transverse direction.

In an exemplary embodiment, a gate insulating layer (not illustrated) may be disposed on the gate line 121, and a semiconductor 154, which may include hydrogenated amorphous silicon (a-Si:H) or polycrystalline silicon (poly-Si), for example, may be disposed on the gate insulating layer.

The data line 171 and a drain electrode 175 may be disposed on the semiconductor 154 and the gate insulating layer.

The data line 171 may transmit a data voltage and may substantially extend in a longitudinal direction to intersect the gate line 121. The data line 171 may include a source electrode 173 extending toward the gate electrode 124.

The drain electrode 175 may be separated from the data line 171 and may have a portion opposing the source electrode 173.

The gate electrode 124, the source electrode 173, and the drain electrode 175, along with the semiconductor 154, may provide the TFT Q.

A protection layer 180 including an insulating material may be disposed on the TFT Q. A contact hole 185 through which the drain electrode 175 is exposed may be defined in the protection layer 180.

The pixel electrode 191 may be disposed on the protection layer 180. In an exemplary embodiment, the pixel electrode 191 may include a transparent conductive material such as indium-tin oxide ("ITO") or indium-zinc oxide ("IZO"), or a reflective metal such as aluminum (Al), silver (Ag), chromium (Cr), or an alloy thereof. The pixel electrode 191 may receive a data voltage applied thereto through the TFT Q which is controlled by a gate signal.

A light shielding member 220, a first column spacer 260, and a projection 40 may be disposed on the protection layer 180. In an exemplary embodiment, the light shielding member 220, the first column spacer 260, and the projection 40 may be patterned in the same process, and may include the same material.

The light shielding member 220 may be disposed on the first substrate 110 corresponding to the light shielding area DA, and may also be referred to as a black matrix to serve to prevent light leakage between the pixel electrodes 191.

The light shielding member 220 may include the first column spacer 260 protruding toward the second substrate 210 and maintaining a gap between the first substrate 110 and the second substrate 210. The first column spacer 260 may correspond to a main column spacer extending from the light shielding member 220 to support the first and second substrates 110 and 210.

Although not illustrated in FIGS. 2 and 3, a second column spacer may be disposed on a pixel adjacent to the pixel illustrated in FIG. 2. In other words, the light shielding member 220 may include the second column spacer protruding toward the second substrate 210 and having a height lower than that of the first column spacer 260. In an exemplary embodiment, the second column spacer may correspond to a sub-column spacer which assists the first column spacer 260. A detailed description pertaining to the second column spacer will be provided further below with reference to FIGS. 12 and 13.

The projection 40 may be disposed above the first substrate 110 and may overlap a portion of the pixel electrode 191. In other words, the projection 40 may overlap a portion of the unit pixel electrode to be described further below. In an exemplary embodiment, the projection 40 may be disposed on the protection layer 180 and may overlap a portion of an edge of the pixel electrode 191.

In addition, the projection 40 may be spaced apart from the light shielding member 220. As illustrated in FIG. 4, the projection 40 may have a portion which is in contact with an edge of the pixel electrode 191 and may have an inclined surface 40a. A liquid crystal molecule 31 (refer to FIG. 3) may have a pretilt along the inclined surface 40a.

In an exemplary embodiment, the projection 40 and the light shielding member 220 may be patterned in the same process, and may include a light absorbing material such as chromium (Cr) in light of the fact that the projection 40 includes the same material included in the light shielding member 220. Accordingly, light leakage occurring on the periphery of the projection 40 may be prevented.

The projection 40 may be patterned simultaneously with the light shielding member 220, the first column spacer 260, and the second column spacer. Accordingly, as compared to a conventional process in which the projection 40, the column spacer, and the light shielding member 220 are separately manufactured, the number of exposure masks required in the illustrated exemplary embodiment may be reduced by one or two and the process efficiency thereof may be enhanced.

The projection 40 may have a height lower than that of the first column spacer 260 and the second column spacer. In an exemplary embodiment, the first column spacer 260 may have a height in a range of about 3.2 μm to about 3.4 μm, the second column spacer may have a height in a range of about 2.7 μm to about 2.9 μm, the light shielding member 220 may have a height in a range of about 2.2 μm to about 2.4 μm, and the projection 40 may have a height in a range of about 0.5 μm to about 1.5 μm, for example. However, the height thereof is not limited thereto.

A description pertaining to the upper display panel 200 will be provided hereinbelow. In the upper display panel 200, a color filter 230 and an upper light shielding member 221 may be disposed on the second substrate 210.

The color filter 230 may display one of primary colors, for example, the three primary colors of red, green, and blue.

Unlike the exemplary embodiments illustrated in FIGS. 3 and 4, the color filter 230 may be disposed on the lower display panel 100. In another exemplary embodiment, the upper light shielding member 221 may be omitted.

An overcoat layer 250 may be disposed on the color filter 230 and the upper light shielding member 221, and the common electrode 270 may be disposed on the overcoat layer 250. In an exemplary embodiment, the common electrode 270 may include a transparent conductive material such as ITO or IZO, or a metal. The common electrode 270 may receive a common voltage applied thereto.

Alignment layers 11 and 21 may be disposed on inner surfaces of the lower and upper display panels 100 and 200, respectively. In an exemplary embodiment, the alignment layers 11 and 21 may be a homeotropic alignment layer, for example.

A polarizer (not illustrated) may be provided on an outer surface of at least one of the lower and upper display panels 100 and 200. Polarizing axes of the polarizers may intersect one another and one of the polarizing axes may be substantially parallel to the gate line 121.

In an exemplary embodiment, the liquid crystal layer 3 interposed between the lower and upper display panels 100 and 200 may include the liquid crystal molecule 31 having a negative dielectric anisotropy, for example. The liquid crystal molecules 31 may be aligned to have a major axis thereof substantially perpendicular to a surface of the lower and upper display panels 100 and 200 in the absence of an electric field being generated in the liquid crystal layer 3.

To sufficiently secure a liquid crystal control force of a pixel, the pixel electrode 191 with respect to the pixel may include a plurality of unit pixel electrodes previously described with reference to FIG. 1, and the common electrode 270 with respect to the pixel may include a plurality of unit common electrodes previously described with reference to FIG. 1. The number of unit pixel electrodes and unit common electrodes included in a pixel may vary based on a liquid crystal control force based on an area occupied by the pixel.

Hereinafter, exemplary embodiments with respect to the plurality of unit pixel electrodes and the plurality of unit common electrodes will be described.

An exemplary embodiment will be described hereinbelow with reference to FIGS. 5 through 13. A pixel PX according to the exemplary embodiment may include a first pixel PX_1 and a second pixel PX_2. The first pixel PX_1 and the second pixel PX_2 may be adjacent to one another.

Figure 5:
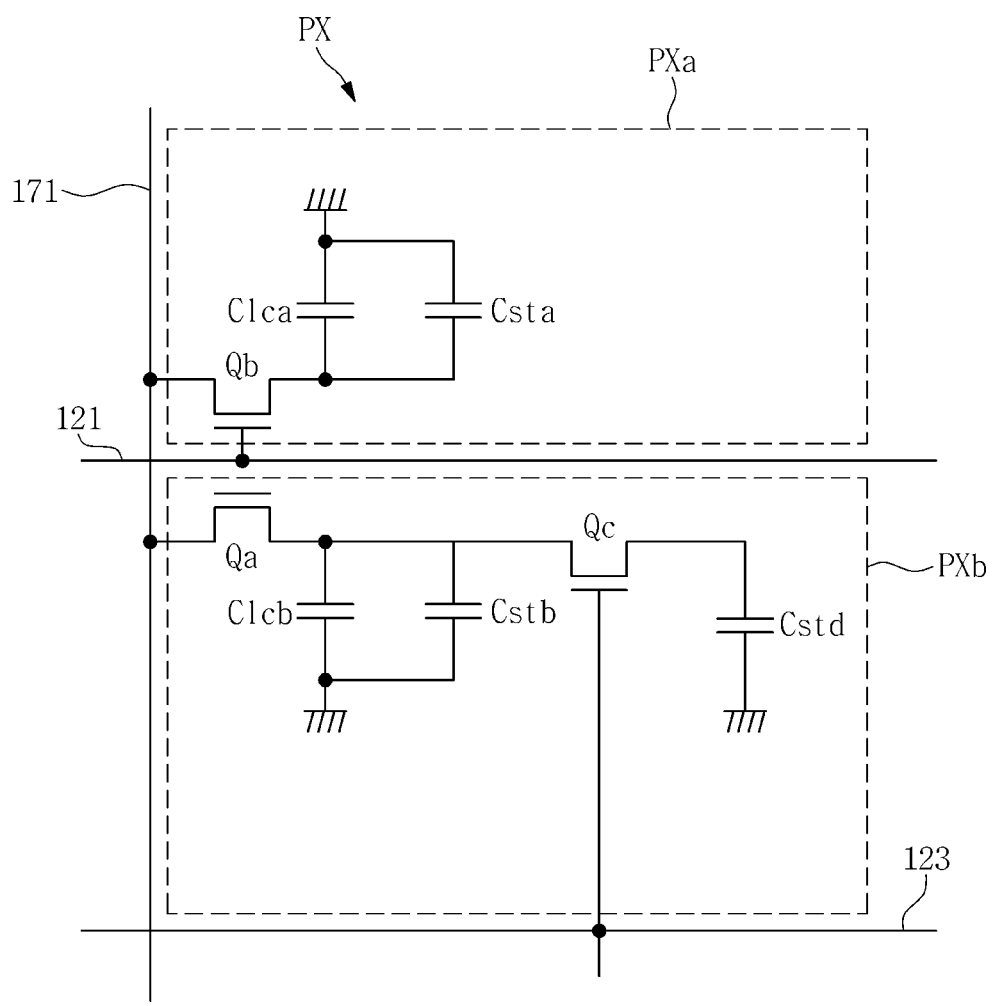
FIG. 5 is an equivalent circuit diagram illustrating an exemplary embodiment of a pixel of an LCD device according to the invention.

FIG. 5 is an equivalent circuit diagram illustrating the pixel PX of an LCD device according to the exemplary embodiment.

Referring to FIG. 5, the LCD device according to the exemplary embodiment may include a signal line including a gate line 121, a voltage-reducing gate line 123 and a data line 171, and the pixel PX connected to the signal line.

Each pixel PX may include a first sub-pixel PXa and a second sub-pixel PXb. The first sub-pixel PXa may include a first switching element Qa, a first liquid crystal capacitor Clca and a first storage capacitor Csta, and the second sub-pixel PXb may include second and third switching elements Qb and Qc, a second liquid crystal capacitor Clcb, a second storage capacitor Cstb, and a voltage-reducing capacitor Cstd.

The first and second switching elements Qa and Qb may be connected to the gate line 121 and the data line 171, and the third switching element Qc may be connected to the voltage-reducing gate line 123.

In an exemplary embodiment, the first and second switching elements Qa and Qb may be a three-terminal element such as a TFT. Control terminals of the first and second switching elements Qa and Qb may be connected to the gate line 121, and input terminals of the first and second switching elements Qa and Qb may be connected to the data line 171, and an output terminals of the first and second switching elements Qa and Qb may be respectively connected to the first and second liquid crystal capacitors Clca and Clcb, and respectively connected to the first and second storage capacitors Csta and Cstb.

In an exemplary embodiment, the third switching element Qc may be a three-terminal element such as a TFT, and a control terminal thereof may be connected to the voltage-reducing gate line 123, and an input terminal thereof may be connected to the second liquid crystal capacitor Clcb, and an output terminal thereof may be connected to the voltage-reducing capacitor Cstd.

The voltage-reducing capacitor Cstd and the output terminal of the third switching element Qc may be connected to a common voltage.

The pixel PX may be operated as follows. A gate-on voltage may be applied to the gate line 121, and, in turn, the first and second switching elements Qa and Qb, being connected to the gate line 121, may be turned on. Accordingly, a data voltage of the data line 171 may be applied to the first and second liquid crystal capacitors Clca and Clcb through the first and second switching elements Qa and Qb, which are turned on, such that the first and second liquid crystal capacitors Clca and Clcb are charged by a voltage having a level equivalent to a level difference between the data voltage and the common voltage. In this case, a gate-off voltage may be applied to the voltage-reducing gate line 123.

Subsequently, when a gate-off voltage is applied to the gate line 121 simultaneously with a gate-on voltage being applied to the voltage-reducing line 123, the first and second switching elements Qa and Qb connected to the gate line 121 may be turned off and the third switching element Qc may be turned on. Accordingly, a level of a charge voltage of the second liquid crystal capacitor Clcb connected to the output terminal of the second switching element Qb may decrease. In this regard, in a case of an LCD device being driven by frame inversion, the level of the charge voltage of the second liquid crystal capacitor Clcb may be invariably lower than a level of a charge voltage of the first liquid crystal capacitor Clca. Thus, by allowing the first and second liquid crystal capacitors Clca and Clcb to have different levels of the charge voltage, side visibility of the LCD device may increase.

Hereinafter, a description pertaining to the first pixel PX_1 according to the exemplary embodiment which has the circuit structure illustrated in FIG. 5 will be provided with reference to FIGS. 6 through 11. The same components and corresponding components in the exemplary embodiment as those previously described in the exemplary embodiment shown in FIGS. 1 to 4 are given the same reference numeral, and a repetitive description thereof will be omitted.

A first sub-pixel electrode 191a, a second sub-pixel electrode 191b, a common electrode 270, and a projection 40 will be described hereinbelow with reference to FIGS. 6 through 8B.

Figure 6:
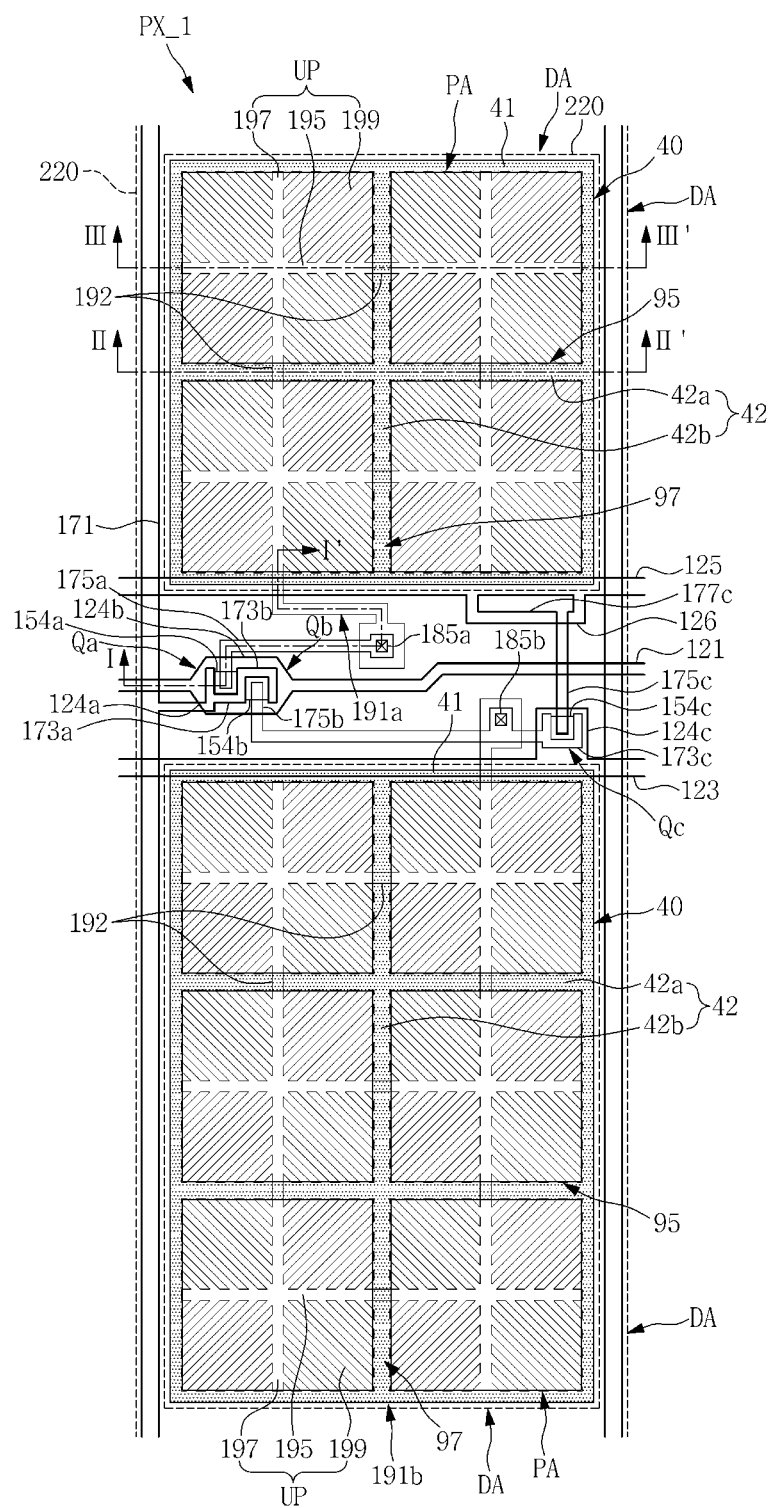
FIG. 6 is a plan view illustrating the exemplary embodiment of a first pixel of an LCD device shown in FIG. 5 according to the invention.
Figure 7A:
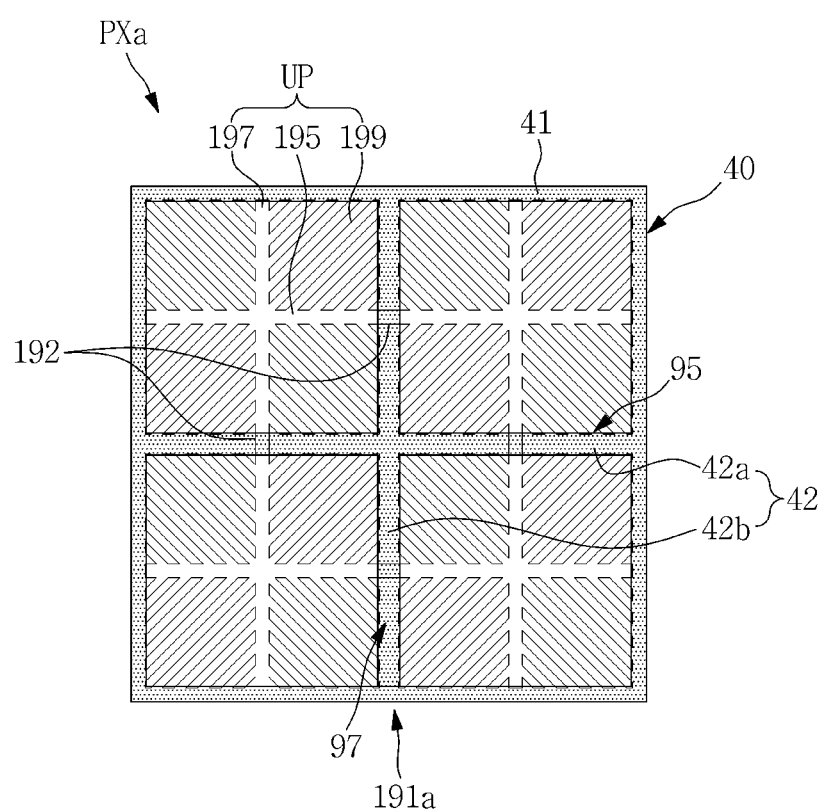
FIGS. 7A and 7B are schematic plan views illustrating a first sub-pixel electrode and a projection of FIG. 6.
Figure 7B:
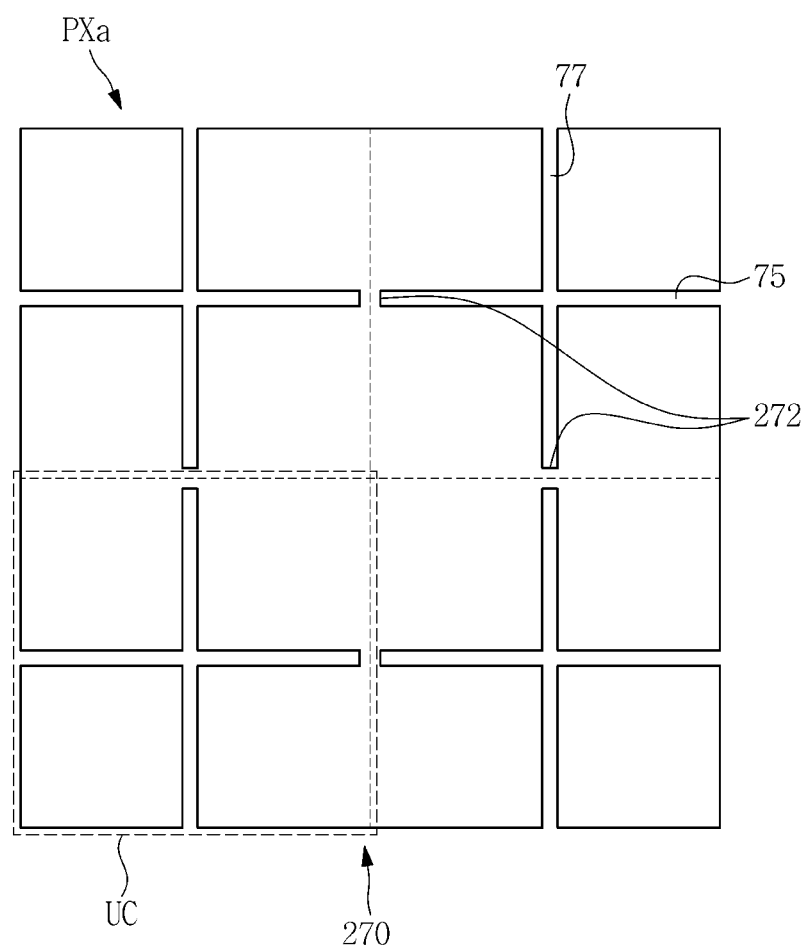
Figure 8A:
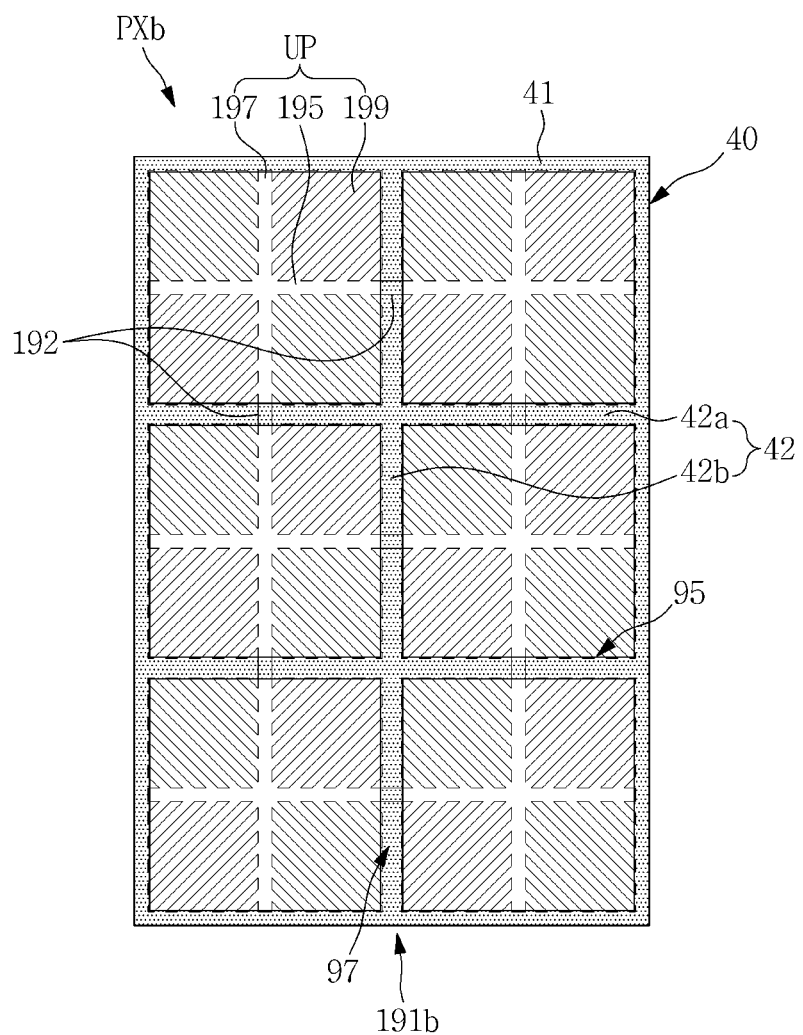
FIGS. 8A and 8B are schematic plan views illustrating a second sub-pixel electrode and a projection of FIG. 6.
Figure 8B:
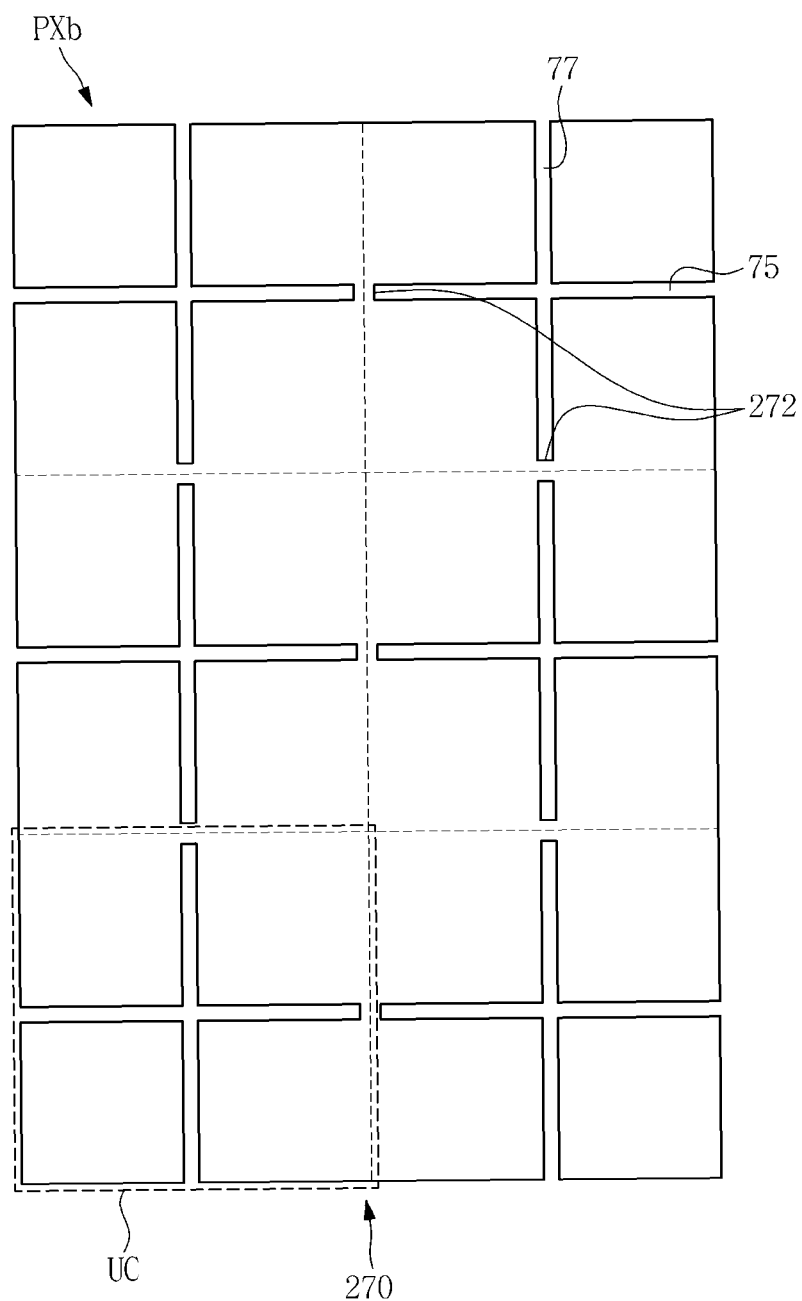

FIG. 6 is a plan view illustrating the first pixel PX_1 of the LCD device according to the exemplary embodiment. FIGS. 7A and 7B are schematic plan views illustrating the first sub-pixel electrode 191a and the projection 40 of FIG. 6. FIGS. 8A and 8B are schematic plan views illustrating the second sub-pixel electrode 191b and the projection 40 of FIG. 6.

Referring to FIGS. 6 through 8B, an example in which the first sub-pixel PXa includes four unit pixel electrodes UP connected to one another and four unit common electrodes UC connected to one another is illustrated in FIGS. 6, 7A, and 7B, and an example in which the second sub-pixel PXb includes six unit pixel electrodes UP connected to one another and six unit common electrodes UC connected to one another is illustrated in FIGS. 6, 8A, and 8B.

In an exemplary embodiment, the unit pixel electrode UP may include a cross-shaped stem portion including a transverse stem portion 195 and a longitudinal stem portion 197, by which a boundary of a plurality of sub-regions of the unit pixel electrode UP is defined, and a minute branch portion 199 extending from the cross-shaped stem portion, for example, the transverse stem portion 195 and the longitudinal stem portion 197, in upper-right, lower-right, upper-left, and lower-left directions.

The plurality of unit pixel electrodes UP may be arranged in a matrix form, and adjacent unit pixel electrodes UP may be connected by at least one first connector 192. The first connector 192 may be an extension of the cross-shaped stem portion of the unit pixel electrode UP, for example, the transverse stem portion 195 and the longitudinal stem portion 197. In other words, the first connector 192 may have a protrusion shape protruding from the cross-shaped stem portion of the unit pixel electrode UP, for example, the transverse stem portion 195 and the longitudinal stem portion 197. In addition, a space between adjacent unit pixel electrodes UP in a column direction, that is a longitudinal direction, may define a transverse gap 95, and a space between adjacent unit pixel electrodes UP in a row direction, that is a transverse direction, may define a longitudinal gap 97.

Respective end portions of the minute branch portions 199 in at least one of upper, lower, left, and right outer boundary portions of the first sub-pixel electrode 191a and the second sub-pixel electrode 191b may be connected to one another. In an exemplary embodiment, at least one of respective end portions of the minute branch portions 199 in the upper outer boundary portion of the first sub-pixel electrode 191a, respective end portions of the minute branch portions 199 in the lower outer boundary portion of the first sub-pixel electrode 191a, respective end portions of the minute branch portions 199 in the left outer boundary portion of the first sub-pixel electrode 191a, and respective end portions of the minute branch portions 199 in the right outer boundary portion of the first sub-pixel electrode 191a, may be connected to one another to thereby provide an outer edge of the first sub-pixel electrode 191a and the second sub-pixel electrode 191b. In addition, at least one of respective end portions of the minute branch portions 199 in the upper outer boundary portion of the second sub-pixel electrode 191b, respective end portions of the minute branch portions 199 in the lower outer boundary portion of the second sub-pixel electrode 191b, respective end portions of the minute branch portions 199 in the left outer boundary portion of the second sub-pixel electrode 191b, and respective end portions of the minute branch portions 199 in the right outer boundary portion of the second sub-pixel electrode 191b, may be connected to one another to thereby provide an outer edge of the second sub-pixel electrode 191b.

The plurality of unit common electrodes UC may be arranged substantially in a matrix form, and adjacent unit common electrodes UC may be connected to one another. Cross-shaped apertures of adjacent unit common electrodes UC opposite to one another in a row or column direction may not be connected to one another, the cross-shaped aperture including a transverse aperture 75 and a longitudinal aperture 77. An area between the cross-shaped apertures (between the transverse apertures 75 and between the longitudinal apertures 77) of adjacent unit common electrodes UC opposite to one another may provide a second connector 272. In other words, the second connector 272 may be an extension of the cross-shaped aperture of the unit common electrodes UC, for example, the transverse aperture 75 and the longitudinal aperture 77. However, according to exemplary embodiments, the cross-shaped apertures, including the transverse aperture 75 and the longitudinal aperture 77, of adjacent unit common electrodes UC opposite to one another may be connected to one another.

Each unit common electrode UC of the common electrode 270 may be aligned to oppose each unit pixel electrode UP of the first sub-pixel electrode 191a and the second sub-pixel electrode 191b. In detail, the cross-shaped stem portion, for example, the transverse stem portion 195 and the longitudinal stem portion 197, of each unit pixel electrode UP of the first sub-pixel electrode 191a and the second sub-pixel electrode 191b may be aligned to oppose the cross-shaped aperture, for example, the transverse aperture 75 and the longitudinal aperture 77, of each unit common electrode UC of the common electrode 270.

The features, characteristics, and/or effects of the unit pixel electrode UP and the unit common electrode UC included in the first sub-pixel PXa and the second sub-pixel PXb according to the illustrated exemplary embodiment may make reference to the analogous features, characteristics, and/or effects described in the exemplary embodiment. The same may apply to exemplary embodiments which are to be described below.

In a case in which an area of the second sub-pixel electrode 191b and an area of the first sub-pixel electrode 191a differ from one another to enhance side visibility, the first sub-pixel electrode 191a may include four unit pixel electrodes UP and the second sub-pixel electrode 191b may include six unit pixel electrodes UP, for example.

The projection 40 may overlap a portion of the first sub-pixel electrode 191a and a portion of the second sub-pixel electrode 191b. In other words, the projection 40 may overlap a portion of the unit pixel electrode UP. In addition, the projection 40 may be disposed between the unit pixel electrodes UP. In an exemplary embodiment, the projection 40 may overlap an edge of the unit pixel electrode UP, for example. In addition, the projection 40 may overlap the first connector 192 of the first sub-pixel electrode 191a and the second sub-pixel electrode 191b. Further, the projection 40 may overlap the second connector 272 of the common electrode 270.

As the projection 40 is disposed in the above-described manner, the projection 40 may include an edge portion 41 and a lattice portion 42 for each pixel. In detail, the edge portion 41 may overlap an edge of the first sub-pixel electrode 191a and the second sub-pixel electrode 191b, and the lattice portion 42 may overlap the cross-shaped aperture of the common electrode 270, for example, the transverse aperture 75 and the longitudinal aperture 77. The lattice portion 42 may include a transverse lattice portion 42a and a longitudinal lattice portion 42b. The lattice portion 42 may overlap the first connector 192 and the second connector 272, and, more particularly, the first connector 192. As the projection 40 includes the edge portion 41 and the lattice portion 42, the projection 40 may be disposed on an edge of each unit pixel electrode UP.

As the projection 40 is disposed in the above-described manner, a liquid crystal may have a pretilt.

Hereinafter, the LCD device according to the exemplary embodiment will be described in greater detail with reference to FIGS. 6, 9, 10, and 11.

Figure 9:
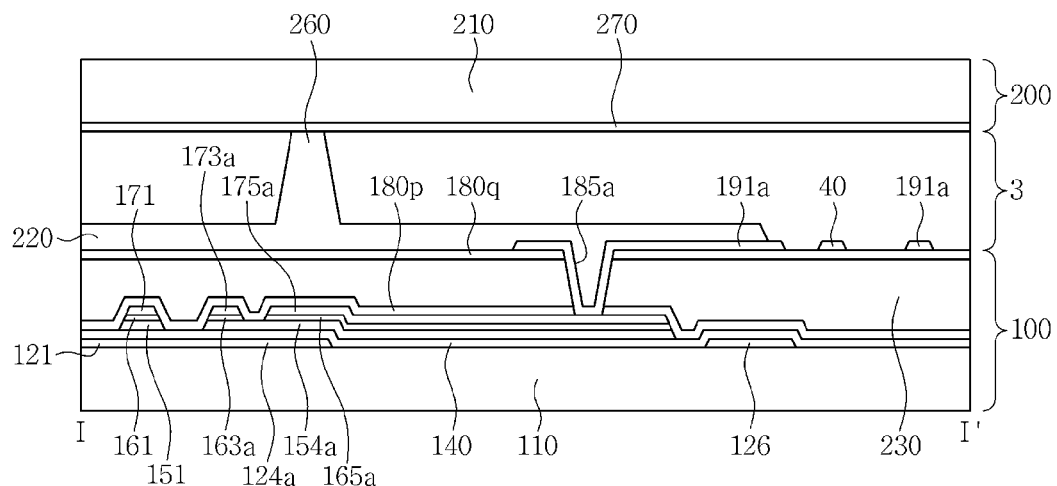
FIG. 9 is a cross-sectional view taken along line I-I' of FIG. 6.
Figure 10:
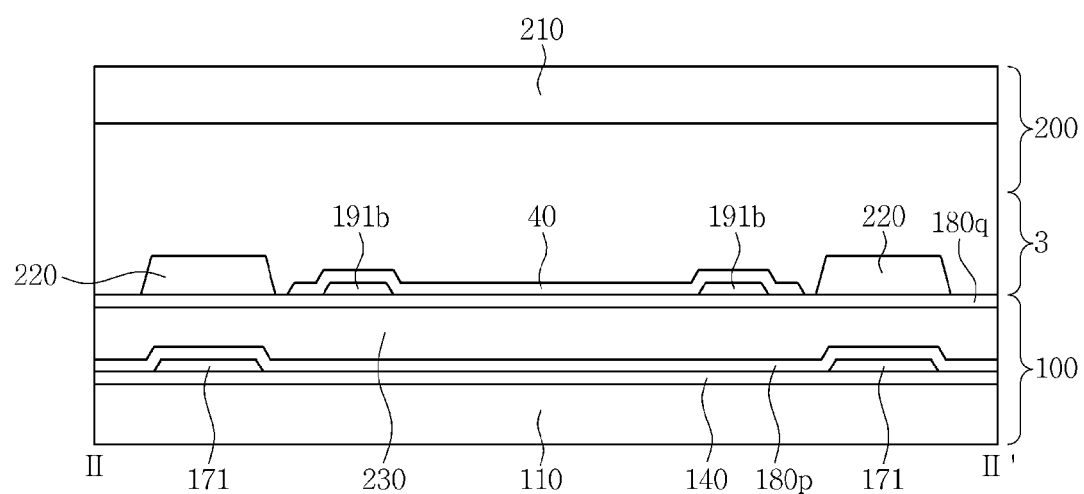
FIG. 10 is a cross-sectional view taken along line II-IF of FIG. 6.
Figure 11:
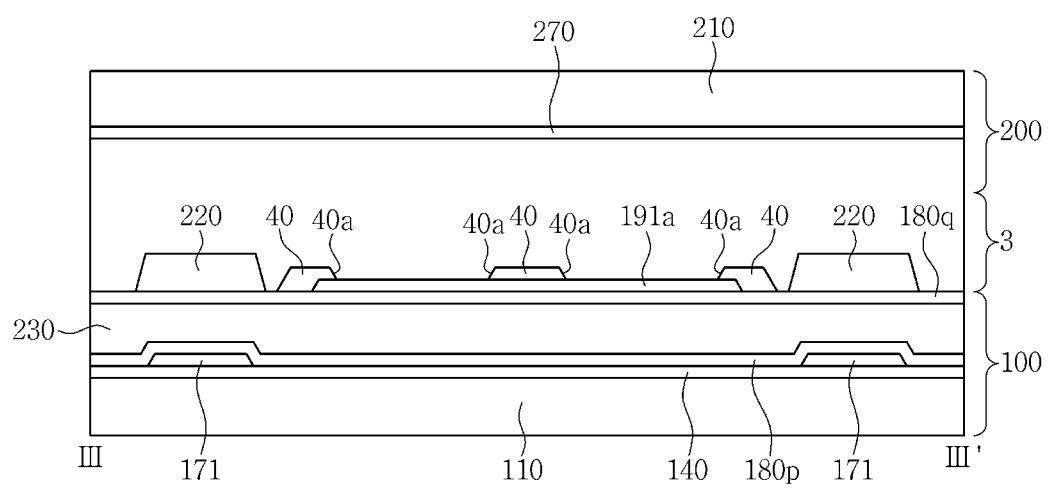
FIG. 11 is a cross-sectional view taken along line III-III' of FIG. 6.

FIG. 9 is a cross-sectional view taken along line I-I' of FIG. 6. FIG. 10 is a cross-sectional view taken along line II-II' of FIG. 6. FIG. 11 is a cross-sectional view taken along line III-III' of FIG. 6.

Referring to FIGS. 6, 9, 10, and 11, the LCD device according to the exemplary embodiment may include a lower display panel 100 and an upper display panel 200 opposing one another, and a liquid crystal layer 3 interposed between the lower and upper display panels 100 and 200.

Since the liquid crystal layer 3 is the same as that described in the exemplary embodiment shown in FIG. 3, a detailed description thereof will be omitted herein for conciseness.

In the lower display panel 100, a first substrate 110 may include a pixel area PA and a light shielding area DA. A plurality of gate conductors including a gate line 121, a voltage-reducing gate line 123, and a storage electrode line 125 may be disposed on the first substrate 110. The gate line 121 and the voltage-reducing gate line 123 may substantially extend in a transverse direction and may transmit a gate signal. The gate line 121 may include a first gate electrode 124a and a second gate electrode 124b, and the voltage-reducing gate line 123 may include a third gate electrode 124c. The first gate electrode 124a and the second gate electrode 124b may be connected to one another. The storage electrode line 125 may substantially extend in a transverse direction and may transmit a predetermined voltage such as a common voltage. The storage electrode line 125 may include a storage extension portion 126. However, the structure of the storage electrode line 125 is not limited thereto.

A gate insulating layer 140 may be disposed on the gate conductor, and a linear semiconductor 151 may be disposed on the gate insulating layer 140. The linear semiconductor 151 may substantially extend in a transverse direction, and may include first and second semiconductors 154a and 154b extending toward the first and second gate electrodes 124a and 124b and connected to one another and a third semiconductor 154c connected to the second semiconductor 154b.

An ohmic contact member 161 may be disposed on the linear semiconductor 151. Ohmic contact members 163a and 165a may be disposed on the first semiconductor 154a. Ohmic contact members (not illustrated) may be disposed on the second semiconductor 154b and the third semiconductor 154c. However, in another exemplary embodiment, the ohmic contact members 161, 163a and 165a may be omitted.

A data conductor including a data line 171, a first drain electrode 175a, a second drain electrode 175b, and a third drain electrode 175c may be disposed on the ohmic contact members 161, 163a and 165a. The data line 171 may include a first source electrode 173a and a second source electrode 173b extending toward the first gate electrode 124a and the second gate electrode 124b.

One bar-shaped end portion of the first drain electrode 175a may be partially enclosed by the first source electrode 173a, and one bar-shaped end portion of the second drain electrode 175b may be partially enclosed by the second source electrode 173b. The other wide end portion of the second drain electrode 175b may further extend to provide a third source electrode 173c which is curved to have a "U" shape. One wide end portion 177c of the third drain electrode 175c may overlap the storage extension portion 126 to provide the voltage-reducing capacitor Cstd, and the other bar-shaped end portion of the third drain electrode 175c may be partially enclosed by the third source electrode 173c.

The first, second, and third gate electrodes 124a, 124b, and 124c, the first, second, and third source electrodes 173a, 173b, and 173c, and the first, second, and third drain electrodes 175a, 175b, and 175c, along with the first, second, and third semiconductors 154a, 154b, and 154c, may respectively provide a single first switching element Qa, a single second switching element Qb, and a single third switching element Qc, respectively.

A lower protection layer 180p may be disposed on the data conductors including the data conductor, such as the data line 171, the first, second, and third drain electrodes 175a, 175b, and 175c, and exposed portions of the first, second, and third semiconductors 154a, 154b, and 154c. A color filter 230 may be disposed on the lower protection layer 180p. In an alternative exemplary embodiment, the color filter 230 may be disposed on the upper display panel 200.

An upper protection layer 180q may be disposed on the color filter 230. A plurality of contact holes 185a and 185b through which the first and second drain electrodes 175a and 175b are exposed may be defined in the lower protection layer 180p and the upper protection layer 180q.

A pixel electrode including the first sub-pixel electrode 191a and the second sub-pixel electrode 191b may be disposed on the upper protection layer 180q.

The first sub-pixel electrode 191a may receive a data voltage applied thereto from the first drain electrode 175a through the contact hole 185a, and the second sub-pixel electrode 191b may receive a data voltage applied thereto from the second drain electrode 175b through the contact hole 185b.

A light shielding member 220, a first column spacer 260, and the projection 40 may be disposed on the upper protection layer 180q. The light shielding member 220, the first column spacer 260, and the projection 40 may be patterned in the same process, and may include the same material. The light shielding member 220 may be disposed on the first substrate 110 corresponding to the light shielding area DA, and, also referred to as a black matrix, may serve to prevent light leakage between the pixel electrodes 191. The light shielding member 220 may include the first column spacer 260 protruding toward the second substrate 210 and maintaining a gap between the first and second substrates 110 and 210. The first column spacer 260 may correspond to a main column spacer extending from the light shielding member 220 and supporting the first and second substrates 110 and 210.

The projection 40 may be spaced apart from the light shielding member 220. A liquid crystal molecule 31 (refer to FIG. 3) may have a pretilt along an inclined surface 40a of the projection 40. In an exemplary embodiment, the projection 40 and the light shielding member 220 may be patterned in the same process, and may include a light absorbing material such as chromium (Cr) in light of the fact that the projection 40 includes the same material included in the light shielding member 220. Accordingly, light leakage occurring on the periphery of the projection 40 may be prevented.

The projection 40 may be patterned simultaneously with the light shielding member 220, the first column spacer 260, and the second column spacer. Accordingly, as compared to a conventional in which the projection 40, the column spacer, and the light shielding member 220 are separately manufactured, the number of exposure masks required in the illustrated exemplary embodiment may be reduced by one or two and the process efficiency thereof may be enhanced.

The projection 40 may have a height lower than that of the first column spacer 260. In an exemplary embodiment, the first column spacer 260 may have a height in a range of about 3.2 μm to about 3.4 μm, the light shielding member 220 may have a height in a range of about 2.2 μm to about 2.4 μm, and the projection 40 may have a height in a range of about 0.5 μm to about 1.5 μm, for example. However, the height thereof is not limited thereto.

In the upper display panel 200, the common electrode 270 may be disposed on the second substrate 210. The shape of the common electrode 270 may be the same as that described with reference to FIGS. 7B and 8B.

The first sub-pixel electrode 191a and the common electrode 270, along with the liquid crystal layer 3 therebetween, may provide the first liquid crystal capacitor Clca (refer to FIG. 5), and the second sub-pixel electrode 191b and the common electrode 270, along with the liquid crystal layer 3 therebetween, may provide the second liquid crystal capacitor Clcb (refer to FIG. 5), such that a level of a voltage applied thereto may be maintained even subsequently to the first and second switching elements Qa and Qb being turned off. In addition, the first and second sub-pixel electrodes 191a and 191b may overlap the storage electrode line 125 to provide the first and second storage capacitors Csta and Cstb (refer to FIG. 5).

Hereinafter, a description pertaining to the second pixel PX_2 according to the exemplary embodiment which has the circuit structure illustrated in FIG. 5 will be provided with reference to FIGS. 12 and 13. The same components and corresponding components in the exemplary embodiment as those previously described in the exemplary embodiment are given the same reference numeral, and a repetitive description thereof will be omitted.

Figure 12:
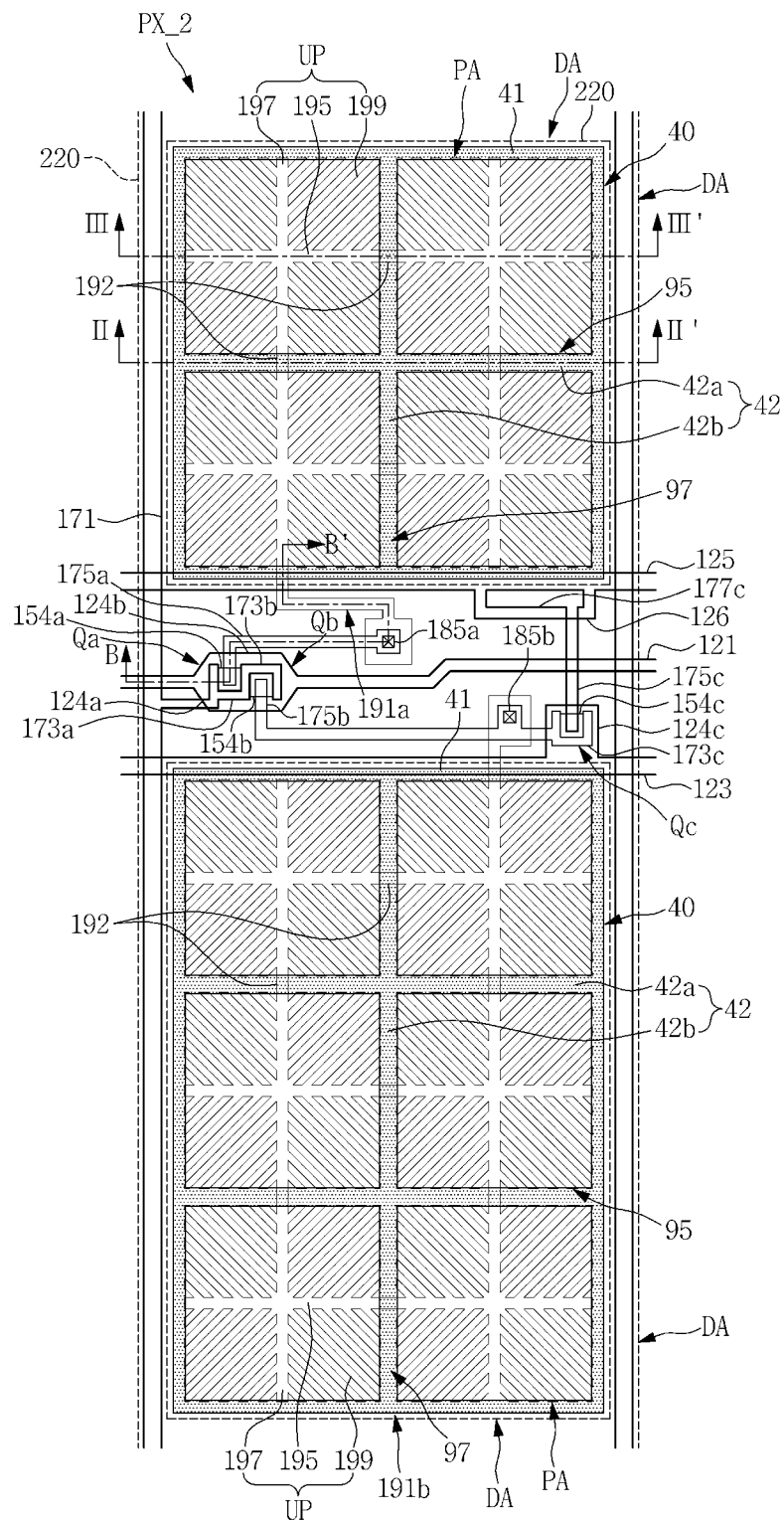
FIG. 12 is a plan view illustrating the exemplary embodiment of a second pixel of the LCD device shown in FIG. 5 according to the invention.
Figure 13:
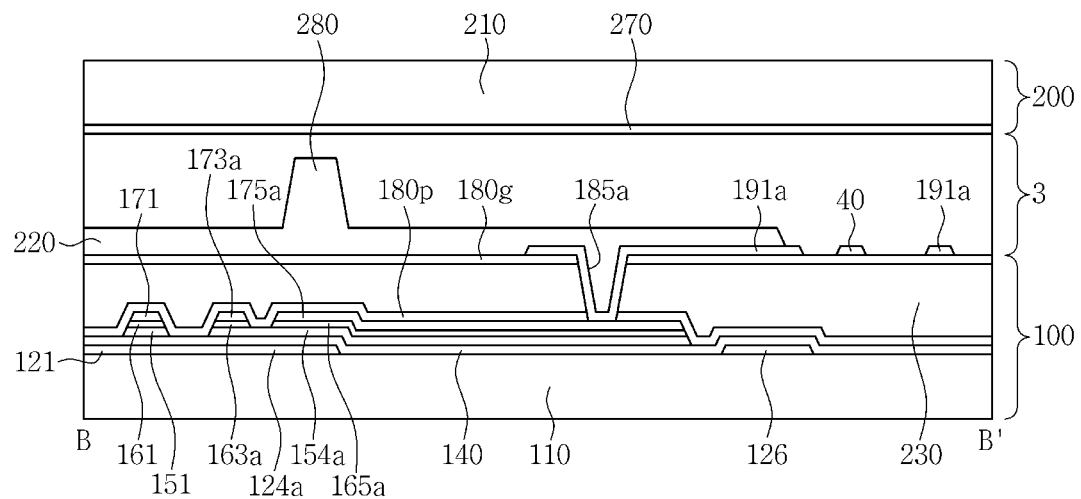
FIG. 13 is a cross-sectional view taken along line B-B' of FIG. 12.

FIG. 12 is a plan view illustrating the second pixel PX_2 of the LCD device according to the exemplary embodiment. FIG. 13 is a cross-sectional view taken along line B-B' of FIG. 12.

The second pixel PX_2 illustrated in FIGS. 12 and 13 may correspond to a pixel adjacent to the first pixel PX_1, and may have the same structure as that of the first pixel PX_1 previously described with reference to FIGS. 6 through 11, aside from a first column spacer 260.

The second pixel PX_2 may include a second column spacer 280 in lieu of the first column spacer 260 illustrated in FIG. 9. A light shielding member 220 may include the second column spacer 280 protruding toward the second substrate 210 and having a height lower than that of the first column spacer 260 of FIG. 9. The second column spacer 280 may correspond to a sub-column spacer which assists the first column spacer 260.

As such, the first column spacer 260 and the second column spacer 280 may be disposed on adjacent pixels, respectively. Alternatively, the first column spacer 260 and the second column spacer 280 may be disposed on a pixel.

Hereinafter, an exemplary embodiment with respect to an LCD device will be described with reference to FIGS. 14 through 18.

The configuration of the LCD device according to the exemplary embodiment may be substantially the same as that of the exemplary embodiment shown in FIGS. 5 to 13, aside from a shape, disposition, and the like, of a pixel electrode 191. For ease of description, the exemplary embodiment will be described with emphasis placed on different exemplary embodiments from the exemplary embodiment shown in FIGS. 5 to 13.

Figure 14:
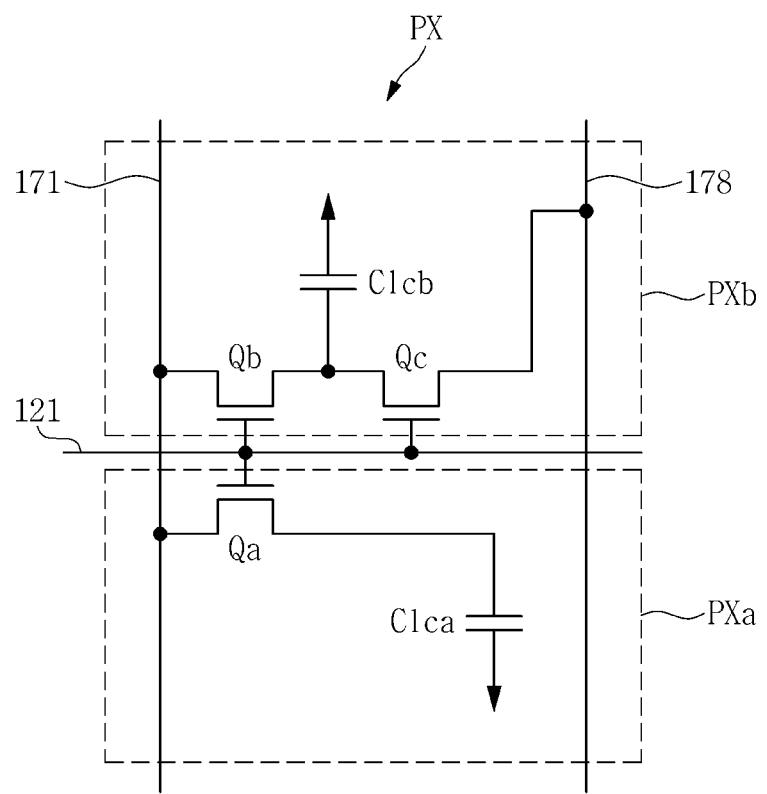
FIG. 14 is an equivalent circuit diagram illustrating an exemplary embodiment of a pixel of an LCD device according to the invention.

FIG. 14 is an equivalent circuit diagram illustrating a pixel PX of the LCD device according to the exemplary embodiment.

Referring to FIG. 14, the LCD device according to the exemplary embodiment may include a signal line such as a gate line 121, a data line 171, and a reference voltage line 178 transmitting a reference voltage, and the pixel PX connected to the signal line.

Each pixel PX may include a first sub-pixel PXa and a second sub-pixel PXb. The first sub-pixel PXa may include a first switching element Qa and a first liquid crystal capacitor Clca, and the second sub-pixel PXb may include second and third switching elements Qb and Qc and a second liquid crystal capacitor Clcb.

The first and switching elements Qa and Qb may be connected to the gate line 121 and the data line 171, and the third switching element Qc may be connected to an output terminal of the second switching element Qb and the reference voltage line 178.

An output terminal of the first switching element Qa may be connected to the first liquid crystal capacitor Clca, and the output terminal of the second switching element Qb may be connected to the second liquid crystal capacitor Clcb and an input terminal of the third switching element Qc. In the third switching element Qc, a control terminal thereof may be connected to the gate line 121, an input terminal thereof may be connected to the second liquid crystal capacitor Clcb, and an output terminal thereof may be connected to the reference voltage line 178.

The pixel PX illustrated in FIG. 14 may be operated as follows. A gate-on voltage may be applied to the gate line 121, and, in turn, the first, second, and third switching elements Qa, Qb, and Qc may be turned on. Accordingly, a data voltage of the data line 171 may be applied to the first and second liquid crystal capacitors Clca and Clcb through the first and second switching elements Qa and Qb, which are turned on, such that the first and second liquid crystal capacitors Clca and Clcb are charged by a voltage having a level equivalent to a level difference between the data voltage and a common voltage. In this case, a data voltage having the same level may be transmitted to the first and second liquid crystal capacitors Clca and Clcb through the first and second switching elements Qa and Qb whereas a charge voltage of the second liquid crystal capacitor Clcb may be divided by the third switching element Qc. Accordingly, a level of the charge voltage of the second liquid crystal capacitor Clcb may be lower than a level of a charge voltage of the first liquid crystal capacitor Clca, and thus, the luminance of the first and second sub-pixels PXa and PXb may differ from one another. In this regard, the level of the charge voltage of the first liquid crystal capacitor Clca and the level of the charge voltage of the second liquid crystal capacitor Clcb may be appropriately adjusted to allow an image viewed from a side direction to be as similar as it can be to an image viewed from a forward direction, such that side visibility may be enhanced.

Figure 18:
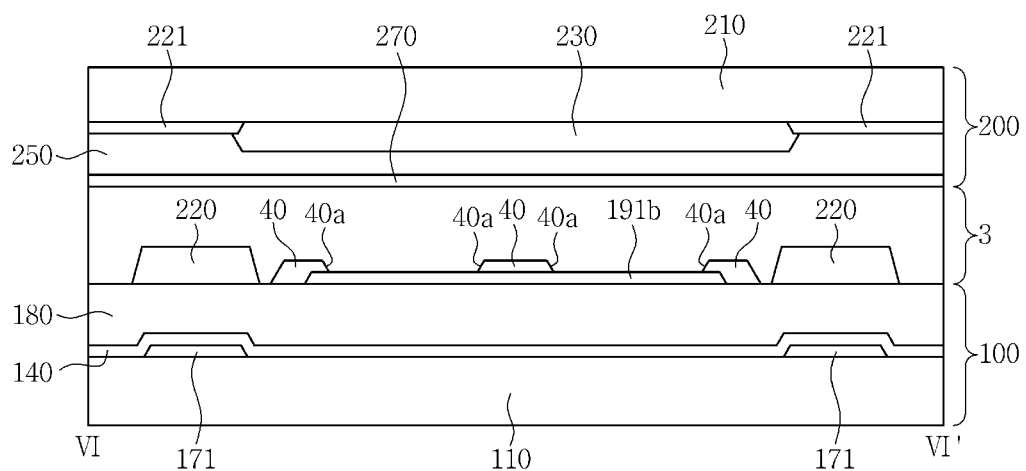
FIG. 18 is a cross-sectional view taken along line VI-VI' of FIG. 15.

A description pertaining to the LCD device according to the exemplary embodiment which has the circuit structure illustrated in FIG. 14 will be provided hereinbelow with reference to FIGS. 15 and 18. The same components and corresponding components in the exemplary embodiment as those previously described in the exemplary embodiments shown in FIGS. 1 to 13 are given the same reference numeral, and a repetitive description thereof will be omitted.

Figure 15:
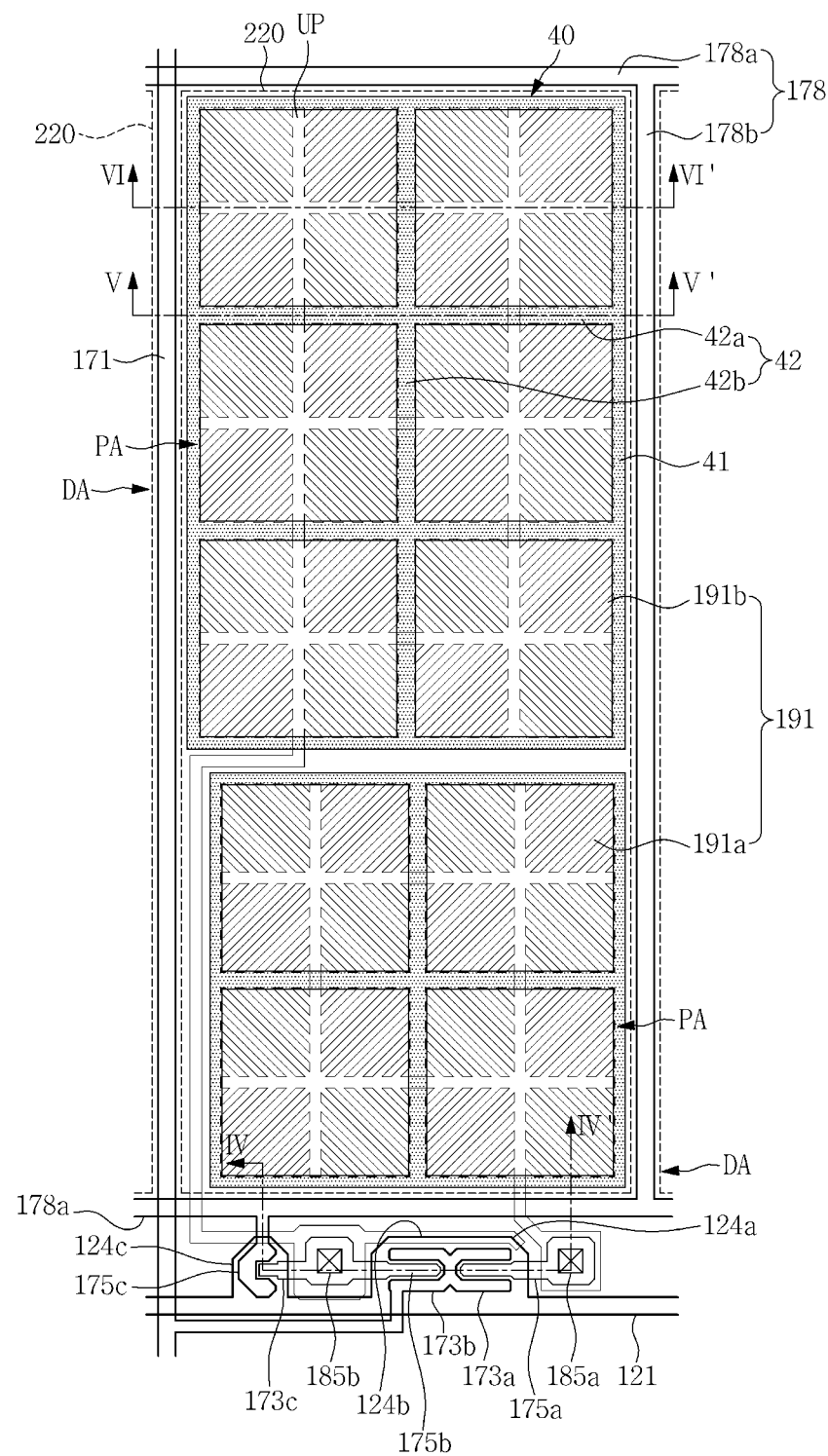
FIG. 15 is a plan view illustrating the exemplary embodiment of the pixel of the LCD device shown in FIG. 14 according to the invention.
Figure 16:
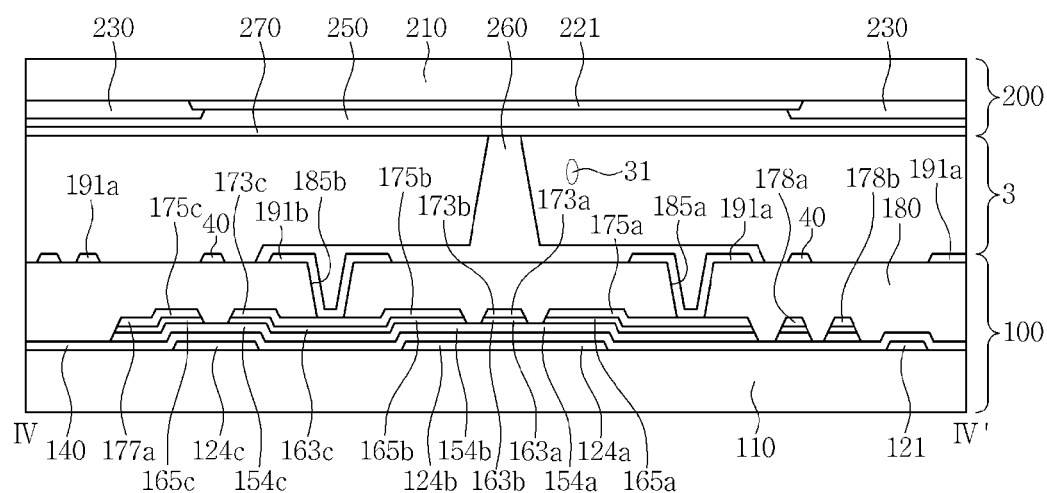
FIG. 16 is a cross-sectional view taken along line IV-IV' of FIG. 15.
Figure 17:
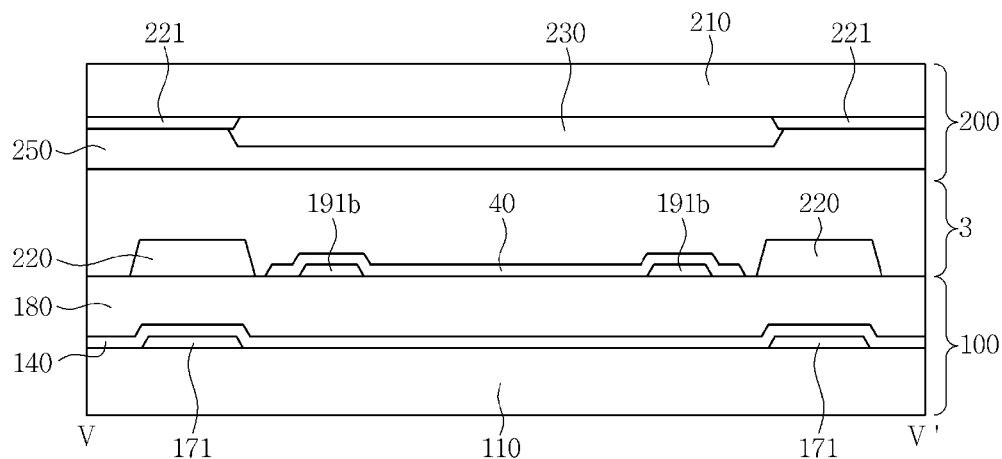
FIG. 17 is a cross-sectional view taken along line V-V' of FIG. 15.

FIG. 15 is a plan view illustrating the pixel PX of the LCD device according to the exemplary embodiment. FIG. 16 is a cross-sectional view taken along line IV-IV' of FIG. 15. FIG. 17 is a cross-sectional view taken along line V-V' of FIG. 15. FIG. 18 is a cross-sectional view taken along line VI-VI' of FIG. 15.

The LCD device according to the exemplary embodiment may include a lower display panel 100 and an upper display panel 200 opposing one another, and a liquid crystal layer 3 interposed between the lower and upper display panels 100 and 200.

Referring to FIG. 15, an example in which a longitudinal side of the pixel PX is longer than a transverse side thereof and the first and second sub-pixels PXa and PXb are adjacent to one another in a longitudinal direction is illustrated.

The gate line 121 which extends in a transverse direction and includes a first gate electrode 124a, a second gate electrode 124b, and a third gate electrode 124c may be disposed on the first substrate 110. A gate insulating layer 140 may be disposed on the gate line 121. A first semiconductor 154a, a second semiconductor 154b, and a third semiconductor 154c may be disposed on the gate insulating layer 140. A plurality of ohmic contact members 163a, 165a, 163b, 165b, 163c, and 165c may be disposed on the first, second, and third semiconductors 154a, 154b, and 154c. A data conductor including the data line 171 extending in a longitudinal direction and including a first source electrode 173a and a second source electrode 173b, a first drain electrode 175a, a second drain electrode 175b, a third source electrode 173c, a third drain electrode 175c, and the reference voltage line 178 may be disposed on the ohmic contact member and the gate insulating layer 140. The reference voltage line 178 may include two stem portions 178b substantially parallel to the data line 171 and a connector 178a connecting the two stem portions 178b.

By connecting the two stem portions 178b of the reference voltage line 178 through the connector 178a, a delay of a signal flowing through the reference voltage line 178 may be prevented. However, the shape of the reference voltage line 178 is not limited thereto, and may be modified into various shapes.

The first gate electrode 124a, the first source electrode 173a, and the first drain electrode 175a, along with the first semiconductor 154a, may provide a first TFT Qa. The second gate electrode 124b, the second source electrode 173b, and the second drain electrode 175b, along with the second semiconductor 154b, may provide a second TFT Qb. The third gate electrode 124c, the third source electrode 173c, and the third drain electrode 175c, along with the third semiconductor 154c, may provide a third TFT Qc.

A protection layer 180 may be disposed on the data conductor and exposed portions of the first, second, and third semiconductors 154a, 154b, and 154c. The protection layer 180 may include a plurality of contact holes 185a and 185b through which the first and second drain electrodes 175a and 175b are exposed, respectively.

The pixel electrode 191 including a first sub-pixel electrode 191a and a second sub-pixel electrode 191b may be disposed on the protection layer 180. The first sub-pixel electrode 191a and the second sub-pixel electrode 191b may have the same structure as that described in the exemplary embodiment in FIG. 6. In particular, in a case in which an area of the second sub-pixel electrode 191b and an area of the first sub-pixel electrode 191a differ from one another to enhance side visibility, the first sub-pixel electrode 191a may include four unit pixel electrodes UP and the second sub-pixel electrode 191b may include six unit pixel electrodes UP.

The first and second sub-pixel electrodes 191a and 191b may be physically and electrically connected to the first and second drain electrodes 175a and 175b through the contact holes 185a and 185b and may receive data voltages applied thereto from the first and second drain electrodes 175a and 175b, respectively. In this case, a portion of the data voltage applied to the second drain electrode 175b may be divided through the third source electrode 173c, such that a level of a voltage applied to the second sub-pixel electrode 191b may be lower than a level of a voltage applied to the first sub-pixel electrode 191a.

In an exemplary embodiment, a level of a voltage applied to the reference voltage line 178 may be higher than a level of a common voltage, and an absolute value of the level difference therebetween may be in a range of about 1 volt (V) to about 4 V, for example.

The light shielding member 220, the first column spacer 260, and the projection 40 may be patterned in the same process, and may include the same material. The light shielding member 220 may be disposed on the first substrate 110 corresponding to the light shielding area DA, and also referred to as a black matrix, may serve to prevent light leakage between the pixel electrodes 191. The light shielding member 220 may include the first column spacer 260 protruding toward the second substrate 210 and maintaining a gap between the first and second substrates 110 and 210. The first column spacer 260 may correspond to a main column spacer extending from the light shielding member 220 and supporting the first and second substrates 110 and 210.

The projection 40 may overlap a portion of the first sub-pixel electrode 191a and a portion of the second sub-pixel electrode 191b. In other words, the projection 40 may overlap a portion of the unit pixel electrode UP. In particular, the projection 40 may be disposed between the unit pixel electrodes UP. In an exemplary embodiment, the projection 40 may overlap an edge of the unit pixel electrode UP, for example. In addition, the projection 40 may overlap the first connector 192 of the first sub-pixel electrode 191a and the second sub-pixel electrode 191b. Further, the projection 40 may overlap the second connector 272 of the common electrode 270.

As the projection 40 is disposed in the above-described manner, the projection 40 may include an edge portion 41 and a lattice portion 42 for each pixel. In detail, the edge portion 41 may overlap an edge of the first sub-pixel electrode 191a and the second sub-pixel electrode 191b, and the lattice portion 42 may overlap a cross-shaped aperture including a transverse aperture 75 and a longitudinal aperture 77 of the common electrode 270. The lattice portion 42 may include a transverse lattice portion 42a and a longitudinal lattice portion 42b. The lattice portion 42 may overlap the first connector 192 and the second connector 272. In particular, the lattice portion 42 may contact the first connector 192. As the projection 40 includes the edge portion 41 and the lattice portion 42, the projection 40 may be disposed on edge of each unit pixel electrode UP.

The projection 40 may be spaced apart from the light shielding member 220. A liquid crystal molecule 31 may have a pretilt along an inclined surface 40a of the projection 40. In an exemplary embodiment, the projection 40 and the light shielding member 220 may be patterned in the same process, and may include a light absorbing material such as chromium (Cr) in light of the fact that the projection 40 includes the same material included in the light shielding member 220, for example. Accordingly, light leakage occurring on the periphery of the projection 40 may be prevented.

The projection 40 may be patterned simultaneously with the light shielding member 220, the first column spacer 260, and the second column spacer. Accordingly, as compared to a conventional process in which the projection 40, the column spacer, and the light shielding member 220 are separately manufactured, the number of exposure masks required in the illustrated exemplary embodiment may be reduced by one or two, and the process efficiency thereof may be enhanced.

The projection 40 may have a height lower than that of the first column spacer 260. In an exemplary embodiment, the first column spacer 260 may have a height in a range of about 3.2 μm to about 3.4 μm, the light shielding member 220 may have a height in a range of about 2.2 μm to about 2.4 μm, and the projection 40 may have a height in a range of about 0.5 μm to about 1.5 μm, for example. However, the height thereof is not limited thereto.

In the upper display panel 200, a color filter 230 and an upper light shielding member 221 may be disposed on the second substrate 210. The color filter 230 may be disposed on the lower display panel 100, and the upper light shielding member 221 may be omitted. An overcoat layer 250 may be disposed on the color filter 230 and the upper light shielding member 221. However, the overcoat layer 250 may be omitted in another exemplary embodiment.

The common electrode 270 may be disposed on the overcoat layer 250. The common electrode 270 disposed in each of the first and second sub-pixels PXa and PXb may have the same structure as that described in the exemplary embodiment shown in FIGS. 7A to 8B. In particular, in a case in which an area of the second sub-pixel PXb and an area of the first sub-pixel PXa differ from one another to enhance side visibility, the common electrode 270 of the first sub-pixel PXa may include four unit pixel electrodes UP as illustrated in FIG. 7B and the common electrode 270 of the second sub-pixel PXb may include six unit pixel electrodes UP as illustrated in FIG. 8B.

Hereinafter, an exemplary embodiment with respect to an LCD device will be described with reference to FIG. 19.

A configuration of the LCD device according to the exemplary embodiment may be substantially the same as that of the exemplary embodiment shown in FIGS. 14 to 18, aside from a shape of a projection 40. For ease of description, the exemplary embodiment will be described with emphasis placed on different exemplary embodiments from the exemplary embodiment shown in FIGS. 14 to 18.

Figure 19:
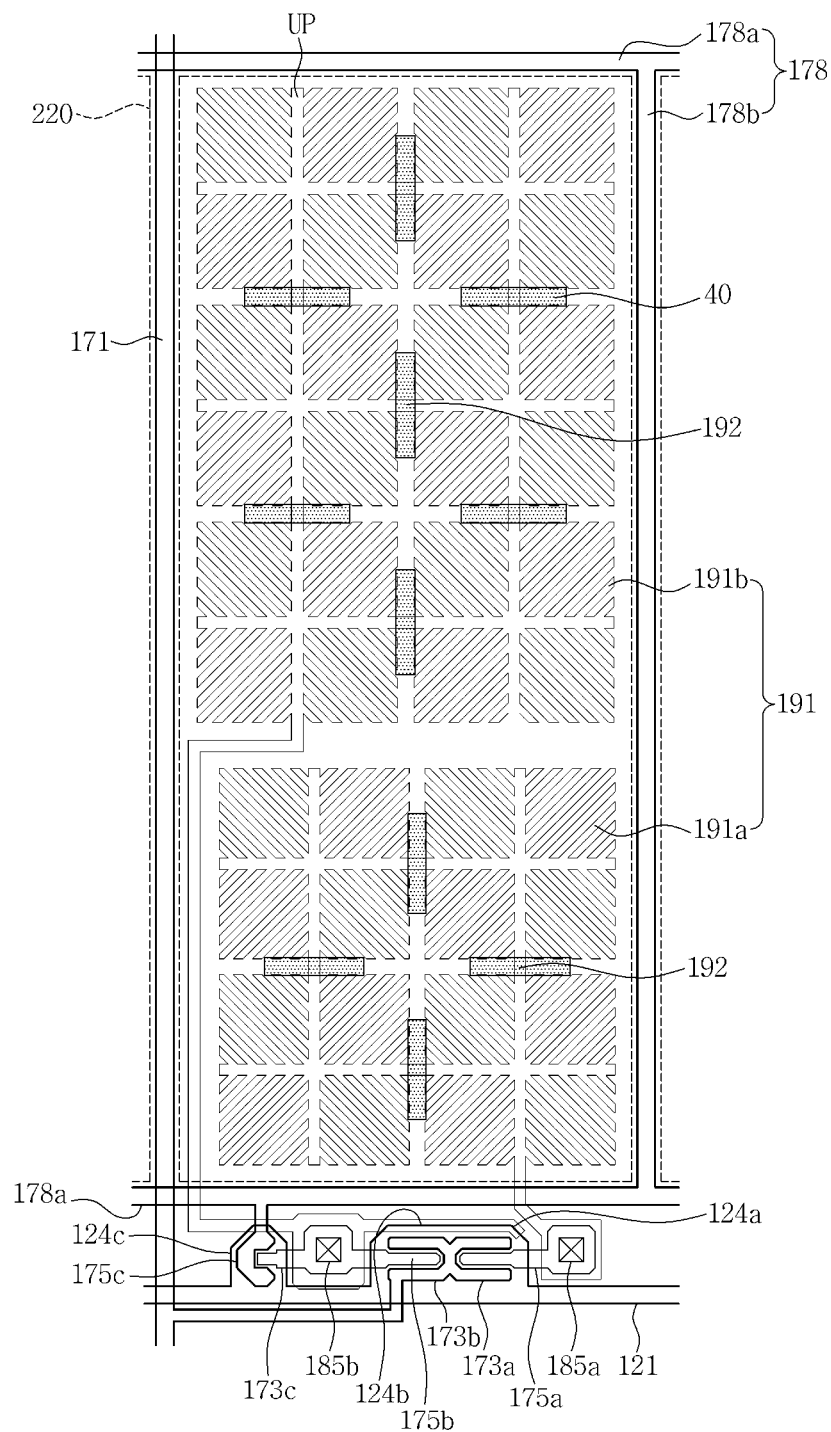
FIG. 19 is a plan view illustrating an exemplary embodiment of a pixel of an LCD device according to the invention.

FIG. 19 is a plan view illustrating a pixel of the LCD device according to the exemplary embodiment.

Referring to FIG. 19, a plurality of projections 40 may be disposed to be spaced apart from one another, and may overlap a first connector 192. The projection 40 may be disposed between unit pixel electrodes UP. When the projection 40 is disposed in the above-described manner in the exemplary embodiment, light transmittance may be enhanced as compared to the case in the exemplary embodiment shown in FIGS. 14 to 18.

Hereinafter, to an exemplary embodiment with respect to an LCD device will be described with reference to FIG. 20.

A configuration of the LCD device according to the exemplary embodiment may be substantially the same as that of the exemplary embodiment shown in FIGS. 14 to 18, aside from a shape of a light shielding member 220. For ease of description, the exemplary embodiment will be described with emphasis placed on different exemplary embodiments from the exemplary embodiment shown in FIGS. 14 to 18.

Figure 20:
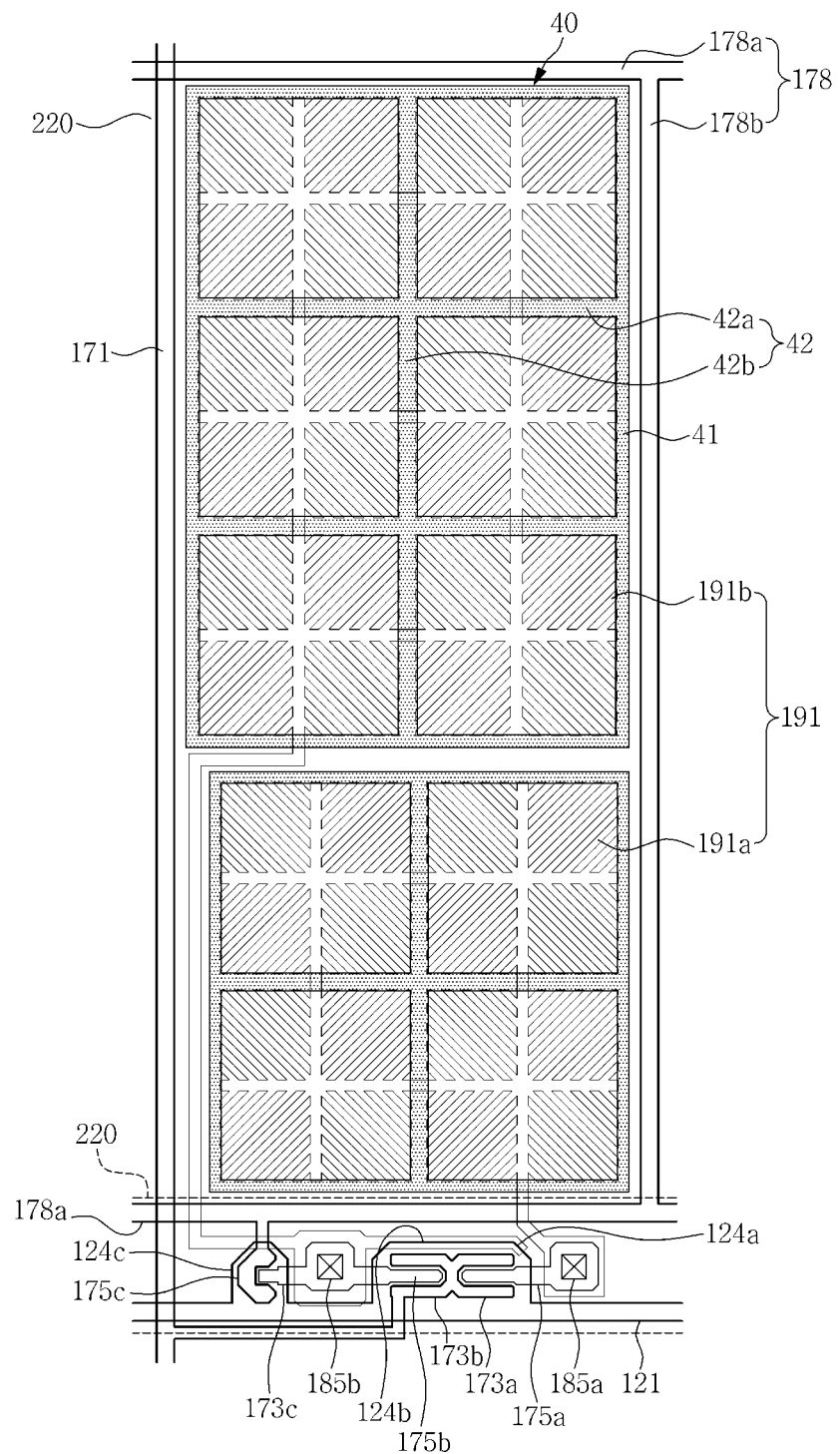
FIG. 20 is a plan view illustrating an exemplary embodiment of a pixel of an LCD device according to the invention.

FIG. 20 is a plan view illustrating a pixel of the LCD device according to the fifth exemplary embodiment.

In a case in which a light shielding member 220 is disposed at a position at which the light shielding member 220 overlaps a data line 171 and a reference voltage line 178, the light shielding member 220 may not be disposed on a connector 178a of the reference voltage line 178 and a portion of the data line 171. When the light shielding member 220 is disposed in the above-described manner, the manufacturing costs thereof may be reduced.

As set forth above, according to one or more exemplary embodiments, the LCD device may enhance process efficiency and may prevent light leakage caused by the projection by patterning the light shielding member, the column spacer, and the projection in the same process.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A liquid crystal display device comprising:
   a first substrate comprising a pixel area and a light shielding area;
   a second substrate opposing the first substrate;
   a liquid crystal layer which is disposed between the first and second substrates;
   a pixel electrode disposed on the first substrate corresponding to the pixel area, the pixel electrode comprising at least one unit pixel electrode;
   a light shielding member disposed on the first substrate corresponding to the light shielding area; and
   a projection which is disposed on the first substrate overlaps a portion of the at least one unit pixel electrode,
   wherein the light shielding area does not overlap the pixel electrode,
   wherein the projection is spaced apart from the light shielding member, and
   wherein the projection is disposed between the light shielding member and the pixel electrode in a plan view.

2. The liquid crystal display device of claim 1, wherein the light shielding member and the projection include a same material.

3. The liquid crystal display device of claim 1, wherein the light shielding member and the projection are patterned in a same process.

4. The liquid crystal display device of claim 3, wherein a portion of the projection contacts an edge of the at least one unit pixel electrode.

5. The liquid crystal display device of claim 4, wherein the projection is disposed between the at least one unit pixel electrodes.

6. The liquid crystal display device of claim 5, wherein the at least one unit pixel electrode comprises a cross-shaped stem portion defining a boundary of a plurality of sub-regions of the at least one unit pixel electrode, and a minute branch portion extending from the cross-shaped stem portion in at least one of upper-right, lower-right, upper-left, and lower-left directions.

7. The liquid crystal display device of claim 6, further comprising a common electrode comprising at least one unit common electrode opposing the at least one unit pixel electrode,
wherein the at least one unit common electrode comprises an aperture opposing the cross-shaped stem portion and extending in parallel thereto.

8. The liquid crystal display device of claim 7, wherein the projection comprises an edge portion overlapping the edge of the at least one unit pixel electrode.

9. The liquid crystal display device of claim 8, wherein the projection comprises a lattice portion overlapping the aperture of the common electrode.

10. The liquid crystal display device of claim 9, wherein the pixel electrode further comprises a plurality of unit pixel electrodes and the common electrode comprises a plurality of unit common electrodes,
the plurality of unit pixel electrodes is connected to one another through a first connector on an extension of the cross-shaped stem portion, and
the plurality of unit common electrodes is connected to one another through a second connector on an extension of the aperture.

11. The liquid crystal display device of claim 10, wherein a portion of the projection overlaps the first connector.

12. The liquid crystal display device of claim 1, wherein the light shielding member comprises a first column spacer which protrudes toward the second substrate, and maintains a gap between the first substrate and the second substrate.

13. The liquid crystal display device of claim 12, wherein the light shielding member further comprises a second column spacer protruding toward the second substrate, the second column spacer having a height lower than a height of the first column spacer.

14. The liquid crystal display device of claim 13, wherein the light shielding member, the first column spacer, the second column spacer, and the projection are patterned in a same process.

15. The liquid crystal display device of claim 13, wherein the projection has a height lower than that of the first column spacer and that of the second column spacer.

16. A liquid crystal display device comprising:
a first substrate comprising a pixel area and a light shielding area;
a second substrate opposing the first substrate;
a liquid crystal layer which is disposed between the first and second substrates;
a pixel electrode disposed on the first substrate corresponding to the pixel area, the pixel electrode comprising at least one unit pixel electrode;
a light shielding member disposed on the first substrate corresponding to the light shielding area; and
a projection which is disposed on the first substrate overlaps a portion of the at least one unit pixel electrode,
wherein the projection is spaced apart from the light shielding member,
wherein the pixel electrode comprises a first sub-pixel electrode comprising at least one unit pixel electrode and a second sub-pixel electrode comprising at least one unit pixel electrode, and
wherein a number of the unit pixel electrodes included in the second sub-pixel electrode is greater than a number of the unit pixel electrodes included in the first sub-pixel electrode.

17. The liquid crystal display device of claim 16, wherein the projection is disposed between the unit pixel electrodes of the first and second sub-pixel electrodes.

18. The liquid crystal display device of claim 17, wherein the projection comprises an edge portion overlapping an edge of the pixel electrode.

19. The liquid crystal display device of claim 18, wherein the projection comprises a lattice portion overlapping an aperture of a common electrode.

* * * * *